(12) United States Patent
Durham et al.

(10) Patent No.: US 10,558,582 B2
(45) Date of Patent: Feb. 11, 2020

(54) TECHNOLOGIES FOR EXECUTE ONLY TRANSACTIONAL MEMORY

(71) Applicant: Intel Corporation, Santa Clara, CA (US)

(72) Inventors: David M. Durham, Beaverton, OR (US); Michael Lemay, Hillsboro, OR (US); Men Long, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 842 days.

(21) Appl. No.: 14/974,972

(22) Filed: Dec. 18, 2015

(65) Prior Publication Data

US 2017/0097898 A1 Apr. 6, 2017

Related U.S. Application Data

(60) Provisional application No. 62/236,405, filed on Oct. 2, 2015.

(51) Int. Cl.
*G06F 12/00* (2006.01)
*G06F 12/1027* (2016.01)
(Continued)

(52) U.S. Cl.
CPC ........ *G06F 12/1027* (2013.01); *G06F 9/3005* (2013.01); *G06F 12/1408* (2013.01); *G06F 2212/402* (2013.01); *G06F 2212/50* (2013.01)

(58) Field of Classification Search
CPC ........... G06F 12/145; G06F 2212/1052; G06F 2009/45587; G06F 9/45558;
(Continued)

(56) References Cited

U.S. PATENT DOCUMENTS

| 8,327,100 B2 | 12/2012 | Batifoulier et al. |
| 2005/0114687 A1* | 5/2005 | Zimmer ............... G06F 9/4401 713/193 |

(Continued)

OTHER PUBLICATIONS

International search report for PCT application No. PCT/US2016/050093, dated Dec. 23, 2016 (4 pages).
(Continued)

*Primary Examiner* — Arvind Talukdar
(74) *Attorney, Agent, or Firm* — Barnes & Thornburg LLP

(57) ABSTRACT

Technologies for execute only transactional memory include a computing device with a processor and a memory. The processor includes an instruction translation lookaside buffer (iTLB) and a data translation lookaside buffer (dTLB). In response to a page miss, the processor determines whether a page physical address is within an execute only transactional (XOT) range of the memory. If within the XOT range, the processor may populate the iTLB with the page physical address and prevent the dTLB from being populated with the page physical address. In response to an asynchronous change of control flow such as an interrupt, the processor determines whether a last iTLB translation is within the XOT range. If within the XOT range, the processor clears or otherwise secures the processor register state. The processor ensures that an XOT range starts execution at an authorized entry point. Other embodiments are described and claimed.

22 Claims, 12 Drawing Sheets

(51) Int. Cl.
*G06F 9/30* (2018.01)
*G06F 12/14* (2006.01)

(58) Field of Classification Search
CPC .............. G06F 12/1009; G06F 9/3005; G06F 12/1408; G06F 2212/402; G06F 2212/50; G06F 12/1027
See application file for complete search history.

(56) References Cited

U.S. PATENT DOCUMENTS

| | | |
|---|---|---|
| 2009/0204969 A1 | 8/2009 | Abadi et al. |
| 2009/0210644 A1* | 8/2009 | Batifoulier .......... G06F 12/1441 711/163 |
| 2010/0023706 A1 | 1/2010 | Christie et al. |
| 2011/0119528 A1 | 5/2011 | Karlson et al. |
| 2013/0132690 A1* | 5/2013 | Epstein .............. G06F 12/1416 711/159 |
| 2014/0040554 A1 | 2/2014 | Pohlack et al. |
| 2014/0040567 A1 | 2/2014 | Pohlack et al. |
| 2014/0281137 A1 | 9/2014 | Circello et al. |
| 2016/0283714 A1 | 9/2016 | LeMay et al. |

OTHER PUBLICATIONS

Written opinion for PCT application No. PCT/US2016/050093, dated Dec. 23, 2016 (4 pages).

Karim El Defrawy et al., "SMART: Secure and Minimal Architecture for (Establishing Dynamic) Root of Trust," in NDSS, 2012, vol. 12, pp. 1-15.

Le Guan et al., "Protecting Private Keys Against Memory Disclosure Attacks Using Hardware Transactional Memory", in Proc. IEEE Symposium on Security & Privacy 2015, May 2015, 17 pages.

Intel Corporation, "How Intel® Itanium® Processor Enables Superior System Security," 2013, 8 pages.

Ivan Krstić, "Behind the Scenes with iOS Security," Black Hat 2016, 80 pages.

Michael Lemay & Carl A. Gunter, "Cumulative Attestation Kernels for Embedded Systems," IEEE Transactions on Smart Grid, Jun. 2012, vol. 3, No. 2, pp. 744-760.

Joseph Yiu, "ARMv8-M Architecture Technical Overview," Nov. 10, 2015, 16 pages, ARM Limited.

* cited by examiner

TECHNOLOGIES FOR EXECUTE ONLY TRANSACTIONAL MEMORY

CROSS-REFERENCE TO RELATED APPLICATION

The present application claims priority under 35 U.S.C. § 119(e) to U.S. Provisional Patent Application Ser. No. 62/236,405, entitled "TECHNOLOGIES FOR EXECUTE ONLY TRANSACTIONAL MEMORY," which was filed on Oct. 2, 2015.

BACKGROUND

Computer processors have historically been classified as complex instruction set computing (CISC) or reduced instruction set computing (RISC) devices. A CISC processor, such as a processor supporting an Intel® instruction set (e.g., Intel® 64, IA-32, etc.), may provide a complex instruction set with variable-length instructions that can include large embedded data. A typical RISC processor, such as a processor supporting an ARM® instruction set, may provide a reduced instruction set that includes fixed-size instructions.

Certain processors may support execute-only memory. In those processors, the contents of execute-only memory may be executed by the processor but may not be read or written to. Certain processors may support secure execution environments. However, entering a secure execution environment may require one or more expensive context switches, such as a world switch from the normal world and back, which can cost thousands of processor cycles.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
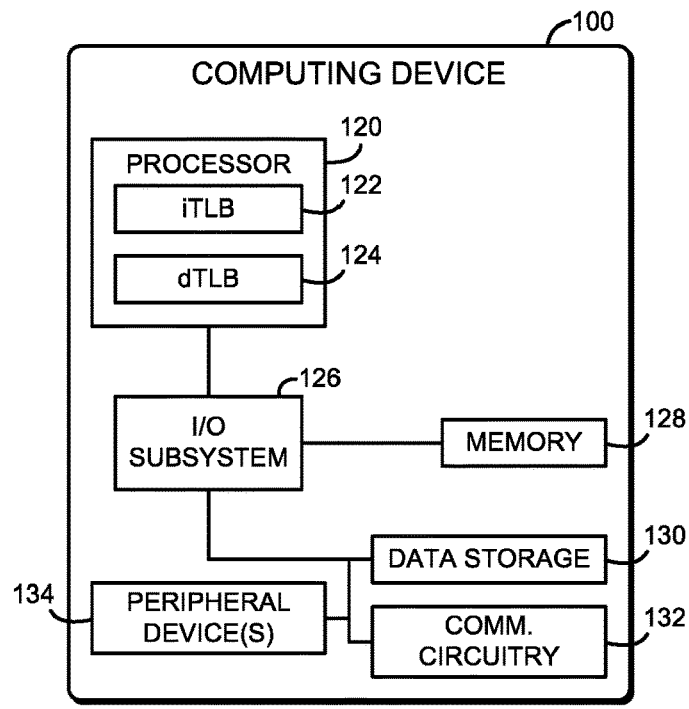
FIG. 1 is a simplified block diagram of at least one embodiment of a computing device for execute only transactional (XOT) memory.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Referring now to FIG. 1, in an illustrative embodiment, a computing device 100 supports executing code paths using an Execute Only Transactional (XOT) memory type. The computing device 100 may designate one or more pages, segments, or other regions of memory as an XOT range and load XOT code paths into the XOT range early in the boot process. XOT code paths may only be executed and may not be read from or written to. Thus, certain processor instructions on the XOT pages allow for secrets to be embedded as part of the instruction (e.g., as immediate values in the instruction). Additionally, upon receiving an interrupt, exception, or other change in control flow other than a branch while executing an XOT code path, the computing device 100 clears or otherwise secures the processor state, protecting the integrity of the instruction flow and associated data. The computing device 100 may also ensure that an XOT code range may only be entered at a predefined entry point, further protecting the integrity of the XOT code and associated data.

Thus, XOT memory ranges may provide an extremely efficient protection mechanism for instructions and immediate data embedded in the instructions. Because XOT protection may be embodied as a memory permission, the protection mechanism may be executed inline without a mode/world switch or other potentially expensive context switch, and without impacting processor pipelining, TLB, or cache state. Thus, the processor 120 of the computing device 100 may provide an essentially instantaneous, free, zero-overhead protection mechanism that shields XOT memory from malware, exploits, and observation. This combination of security without overhead may improve power efficiency and scalability, allowing the same protected CISC code to execute on a wide variety of devices, from small, simple, power efficient devices (e.g., embedded controllers, Internet of Things (IoT) devices, or other small devices) up to high-performance computers and servers. Furthermore, unlike privilege separation or process separation, XOT may not rely on an executive monitor, operating system (OS), or other controlling software entity. Accordingly, the operating system and platform firmware may be eliminated from the trusted code base (TCB) of the computing device 100 because processor hardware and/or microcode enforces the XOT memory type. Similarly, devices are excluded from the TCB because the hardware prevents device access to the XOT memory regions. Further, every XOT code path is fundamentally separate and distinct from every other XOT code path. Additionally, since XOT may be embodied as a new memory permission and/or memory type, XOT memory may require no new processor instructions and thus XOT code paths may be backward compatible. Thus, computer programs written, compiled, or otherwise targeted to run in an XOT memory range may also run on legacy systems, of course without the additional security protections afforded by the XOT memory range. Similarly, the same code path may execute without XOT protection to facilitate debugging.

XOT code can run at any privilege level in the computing device 100, but still may be access-controlled and managed by an operating system (OS) to prevent unauthorized XOT programs from accessing system resources. XOT code paths protected by the computing device 100 may maintain secrets, operate on those secrets (e.g., using AES-NI instructions provided by certain Intel® processors), or use those secrets to access other platform resources transactionally (e.g., using I/O instructions such as the x86 IN/OUT instructions). For example, XOT code may be used to orchestrate an entire system-on-a-chip (SoC), locking and unlocking devices, IP blocks, and other functional blocks for exclusive access by authorized code paths. Therefore, in some embodiments, XOT code pages may be the exclusive access mechanism for hardware devices such as SoC devices or IP blocks, preventing malware or exploits from tampering with device state.

The computing device 100 may be embodied as any type of computation or computer device capable of performing the functions described herein, including, without limitation, a server, a workstation, a computer, a desktop computer, a laptop computer, a notebook computer, a tablet computer, a mobile computing device, a wearable computing device, a network appliance, a web appliance, an embedded computing device, a distributed computing system, a processor-based system, and/or a consumer electronic device. As shown in FIG. 1, the computing device 100 illustratively includes a processor 120, an input/output subsystem 126, a memory 128, a data storage device 130, and communication circuitry 132. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 128, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. The processor 120 includes support for a complex instruction set and thus may be referred to as a complex instruction set computing (CISC) processor. In particular, the processor 120 may support an instruction set such as Intel® 64 or IA-32 that allows for a rich encoding of data as part of the instructions themselves, for example by supporting variable-sized immediate data. As all of the data on an XOT page can be trusted as part of an authenticated control flow, all the immediate data can be trusted, as well as inaccessible and unmodifiable by malware, the OS, devices, or even other XOT code.

The processor 120 further includes an instruction translation lookaside buffer (iTLB) 122 and a data translation lookaside buffer (dTLB) 124. Each of the iTLB 122 and the dTLB 124 may be embodied as a cache or other memory structure that maintains page table mappings between virtual memory addresses and physical memory address. The iTLB 122 is used for executing instructions (e.g., fetching and executing instructions from the location of the current instruction pointer of the processor 120) and the dTLB 124 is used for accessing data (e.g., accessing the memory 128 using load/store instructions). As described further below, the processor 120 supports an execute only transactional (XOT) memory type for executing certain code paths. As described below, the processor 120 may enforce the XOT memory type using one or more XOT range registers as well as any combination of hardware, firmware, and/or microcode event handlers, including a page miss handler, an interrupt handler, and/or a page mapping change handler.

The memory 128 may be embodied as any type of volatile or non-volatile memory or data storage capable of performing the functions described herein. In operation, the memory 128 may store various data and software used during operation of the computing device 100 such as operating systems, applications, programs, libraries, and drivers. As described further below, one or more parts of the memory 128 may be designated as XOT ranges and may include XOT code paths. The memory 128 is communicatively coupled to the processor 120 via the I/O subsystem 126, which may be embodied as circuitry and/or components to facilitate input/output operations with the processor 120, the memory 128, and other components of the computing device 100. For example, the I/O subsystem 126 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 126 may form a portion of a system-on-a-chip (SoC) and be incorporated, along with the processor 120, the memory 128, and other components of the computing device 100, on a single integrated circuit chip.

The data storage device 130 may be embodied as any type of device or devices configured for short-term or long-term storage of data such as, for example, memory devices and circuits, memory cards, hard disk drives, solid-state drives, or other data storage devices. The data storage device 130 may store, for example, images of XOT code paths that may be loaded into the memory 128. The communication circuitry 132 of the computing device 100 may be embodied as any communication circuit, device, or collection thereof, capable of enabling communications between the computing device 100 and other remote devices over a network. The communication circuitry 132 may be configured to use any one or more communication technology (e.g., wired or wireless communications) and associated protocols (e.g., Ethernet, Bluetooth®, Wi-Fi®, WiMAX, etc.) to effect such communication.

In some embodiments, the computing device 100 may also include one or more peripheral devices 134. The peripheral devices 134 may include any number of additional input/output devices, interface devices, and/or other peripheral devices. For example, in some embodiments, the peripheral devices 134 may include a display, touch screen, graphics circuitry, keyboard, mouse, speaker system, microphone, network interface, and/or other input/output devices, interface devices, and/or peripheral devices.

Figure 2:
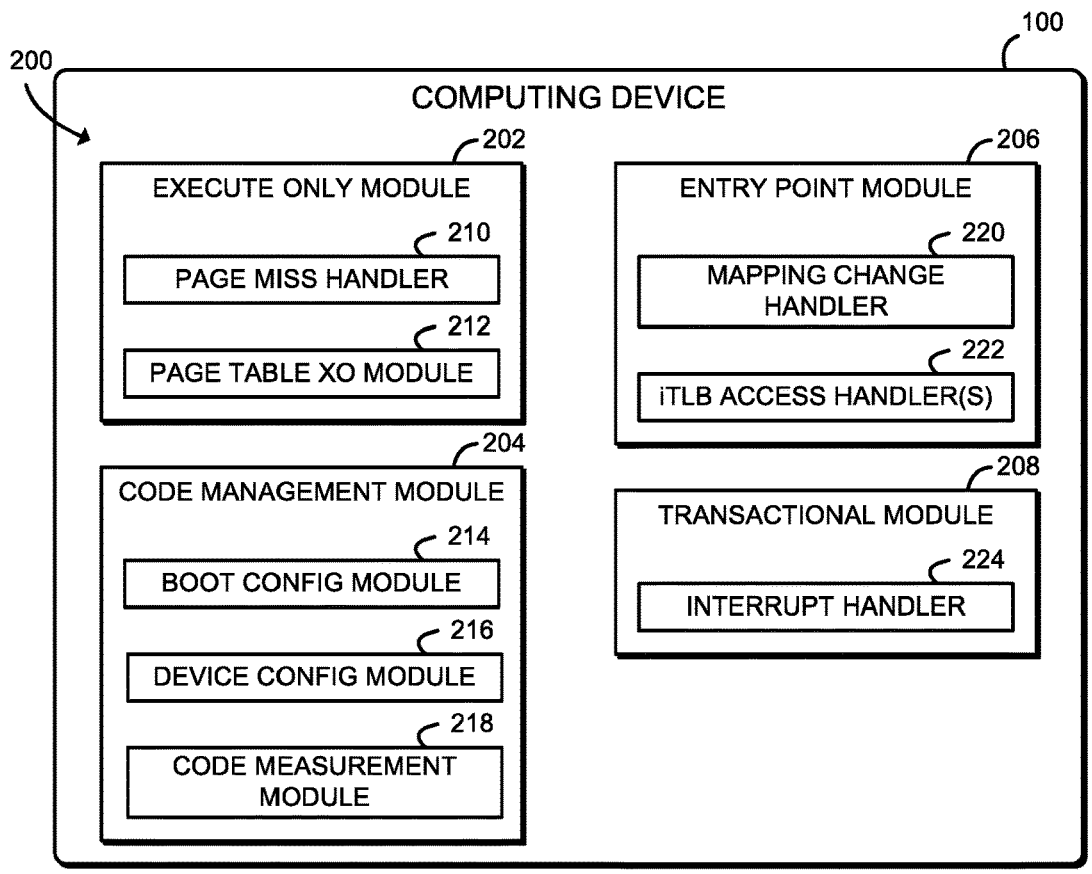
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes an execute only module 202, a code management module 204, an entry point module 206, and a transactional module 208. The various modules of the environment 200 may be embodied as hardware, firmware, microcode, software, or a combination thereof. As such, in some embodiments, one or more of the modules of the environment 200 may be embodied as circuitry or collection of electrical devices (e.g., execute only circuitry 202, code management circuitry 204, entry point circuitry 206, and/or transactional circuitry 208). It should be appreciated that, in such embodiments, one or more of the execute only circuitry 202, the code management circuitry 204, the entry point circuitry 206, and/or the transactional circuitry 208 may form a portion of one or more of the processor 120, the I/O subsystem 126, and/or other components of the computing device 100. Additionally, in some embodiments, one or more of the illustrative modules may form a portion of another module and/or one or more of the illustrative modules may be independent of one another.

The execute only module 202 is configured to designate or otherwise configure XOT ranges and ensure that XOT ranges can be executed by the processor 120 but cannot be read or written to. In particular, the execute only module 202 may be configured to execute a page miss handler 210 of the processor 120 in response to a page miss. The page miss handler 210 is configured to determine a virtual-to-physical address mapping and determine whether the physical memory address is within an XOT range of the memory 128. If so, the page miss handler 210 is configured to populate the iTLB 122 with the virtual-to-physical address mapping and prevent the dTLB 124 from being populated with the virtual-to-physical address mapping. The page miss handler 210 may be further configured to determine whether a page size associated with the XOT range matches a page size indicated by a page table of the computing device 100 and, if not, generate page size mismatch fault. Additionally or alternatively, in some embodiments, the execute only module 202 may include a page table execute only module 212, which may be configured to enforce the execute-only property of an XOT range using operating system page tables and/or Extended Page Tables (EPT) support of the processor 120. For example, each page table (and/or EPT) entry may support an XOT memory type or permission.

The code management module 204 is configured to securely load, measure, and execute XOT code paths within XOT ranges in the memory 128. In particular, the code management module 204 may be configured to execute a reset vector, load an XOT code image into an XOT range from the reset vector, and lock or otherwise configure the XOT range after loading the XOT code image. The code management module 204 may also be configured to measure the XOT code image. When executed, the XOT code image may be configured to configure one or more port I/O devices of the computing device 100 with secret(s) stored as immediate values in instructions of the XOT code image (e.g., in one or more move instructions). When executed, the XOT code image may securely load and measure additional XOT code images, and configure additional XOT ranges. For example, the XOT code image may include a secret value encoded in the XOT memory that may open additional XOT memory ranges or access I/O devices using the secret established through port I/O instructions. Additionally or alternatively, the XOT code image may access special purpose processor registers that can be programmed with a secret from XOT code and then used to access additional platform resources, I/O devices, memory regions, storage regions, or other resources. If the transaction is aborted, then the secret is cleared and the device/memory access will stop. In some embodiments, those functions may be performed by one or more sub-modules, such as a boot configuration module 214, a device configuration module 216, and/or a code measurement module 218.

The entry point module 206 is configured to ensure that XOT code paths in XOT ranges begin execution only at authorized entry points. In particular, the entry point module 206 may be configured to execute a mapping change handler 220 of the processor 120 in response to a change in value of the last translation of the iTLB 122. For example, the mapping change handler 220 may be executed in response to a change in an iTLB hit buffer maintained by the processor 120. The mapping change handler 220 is configured to determine the physical memory address of the last translation iTLB 122, and determine whether that physical memory address is within an XOT range. If so, the mapping change handler 220 is configured to determine whether an offset part of the physical memory address (e.g., a predefined number of lower-order bits) matches a predefined entry point and, if not, generate a fault.

In some embodiments, the entry point module 206 may be configured to execute one or more iTLB 122 access handlers 222, such as an iTLB miss handler, an iTLB hit handler, or an iTLB access handler that is invoked on either an iTLB hit or an iTLB miss. For example, an iTLB miss handler 222 may be configured to determine whether a physical memory address that satisfies the iTLB 122 miss is within the execute only transaction range. If so, the iTLB miss handler 222 is configured to determine whether the physical memory address is at an authorized entry point and, if not, generate a fault.

In some embodiments, the iTLB miss handler 222 may be configured to record an XOT index of the virtual-to-physical address mapping inserted into the iTLB 122. In those embodiments, an iTLB hit handler 222 may be configured to determine whether a previous instruction executed by the processor 120 was executed within an XOT range. If so, the iTLB hit handler 222 is configured to determine whether an index of a virtual-to-physical address mapping associated with the iTLB 122 hit matches the recorded XOT index and, if not, evict the entry of the iTLB 122 at the recorded XOT index.

Additionally or alternatively, the iTLB miss handler 222 may be configured to record an index of the virtual-to-physical address mapping inserted into the iTLB 122 as a last-used instruction translation buffer entry and set an XOT bit on the corresponding entry in the iTLB 122. In those embodiments, an iTLB hit handler 222 may be configured to determine whether an index of a virtual-to-physical address mapping associated with the iTLB hit matches the index of the last-used iTLB entry. If not, the iTLB hit handler 222 is configured to determine whether the XOT bit of the virtual-to-physical address mapping associated with the iTLB hit is set. If so, the iTLB hit handler 222 is configured to determine whether a physical memory address associated with the iTLB hit is at an authorized entry point and, if not, generate a fault. After a successful iTLB hit, the iTLB hit handler 222 may be configured to update the index of the last-used iTLB entry.

The transactional module 208 is configured to protect internal state of the XOT code path, which may include secrets, from being accessed by other entities of the computing device 100. In particular, the transactional module 208 may be configured to execute an interrupt handler 224 of the processor 120 in response to a change of control flow that is not a branch (such as an interrupt, fault, and/or exception). The interrupt handler 224 is configured to determine whether a last instruction pointer physical address is within an XOT range and, if so, secure the state of the processor 120. Securing the state of the processor 120 may include clearing or rolling back one or more registers of the processor 120, clearing one or more thread-local storage areas in the memory 128, clearing dirty entries in a local cache memory of the processor 120, and/or encrypting the processor 120 state and storing the encrypted processor state.

Figure 3:
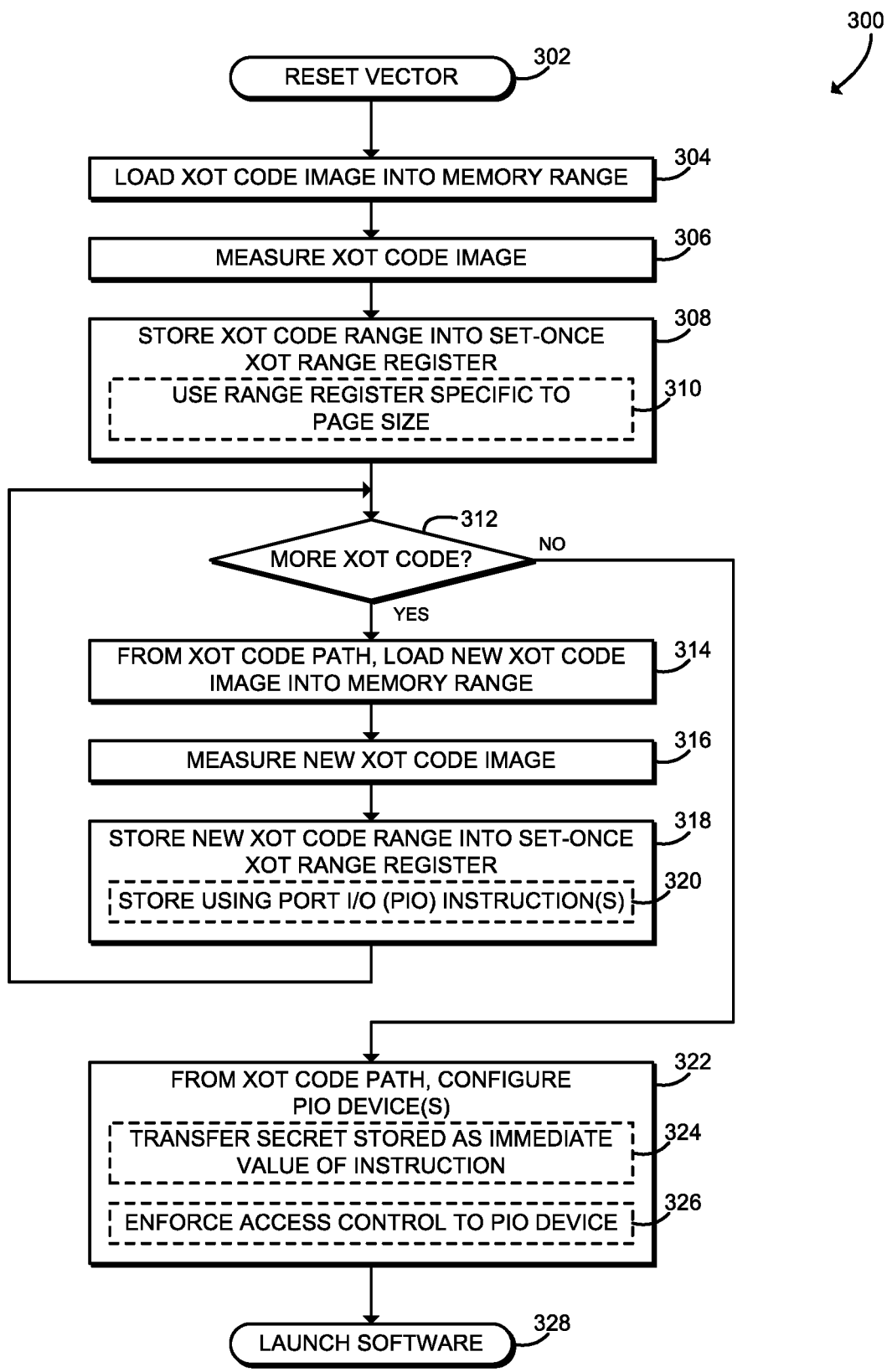
FIG. 3 is a simplified flow diagram of at least one embodiment of a method for boot time XOT configuration that may be executed by the computing device of FIGS. 1-2.

Referring now to FIG. 3, in use, the computing device 100 may execute a method 300 for boot time XOT configuration. The method 300 begins with block 302, in which the computing device 100 executes a reset vector at boot time. For example, after a platform reset or other power cycle, the hardware and/or firmware of the computing device 100 may jump to a predefined address in platform firmware to begin execution. The reset vector may point to a location in firmware, a location in platform flash memory, or other location that may not be tampered with by an operating system or other software entities executed by the computing device 100.

In block 304, the computing device 100 loads an XOT code image (e.g., a code image including one or more XOT code paths) into a particular memory range of the memory 128. In block 306, the computing device 100 measures the XOT code image. For example, the computing device 100 may generate a cryptographic hash or other cryptographic measurement of the contents of the XOT code image in the memory 128. The measurement may be used to attest to the authenticity of the XOT code image. Because the XOT code image is loaded and measured by the boot firmware of the computing device 100, the measurement of the XOT code image may be trusted by other entities executed by the computing device 100.

In block 308, the computing device 100 locks the XOT range that includes the XOT code image by writing to one or more set-once XOT range register(s) of the processor 120. As described further below, the XOT range register(s) may be used to block software, firmware, SMM, and other accesses to the XOT memory. In some embodiments, in block 310, the computing device 100 may use a range register that is specific to the page size of the XOT memory range. For example, the processor 120 of the computing device 100 may support different range registers for an XOT range that maps to large and/or huge pages (e.g., 4 MB) as compared to an XOT range that maps to small pages (e.g., 4 kB).

In block 312, the computing device 100 determines whether additional XOT code paths should be loaded. If not, the method 300 branches ahead to block 322, described below. If additional code paths should be loaded, the method 300 advances to block 314.

In block 314, from an existing XOT code path, the computing device 100 loads another XOT code image into a memory range of the memory 128. In block 316, the computing device 100 measures the newly loaded XOT code image from the pre-existing XOT code path. For example, the computing device 100 may generate a cryptographic hash or other cryptographic measurement of the contents of the newly loaded XOT code image in the memory 128. The measurement may be used to attest to the authenticity of the newly loaded XOT code image. Because the XOT code image is loaded and measured by another XOT code path of the computing device 100, the measurement of the XOT code image may be trusted by other entities executed by the computing device 100.

In block 318, from the existing XOT code path, the computing device 100 locks the XOT range that includes the newly loaded XOT code image by writing to one or more set-once XOT range register(s) of the processor 120. As described further below, the XOT range register(s) may be used to block software, firmware, SMM, and other accesses to the XOT memory. In some embodiments, the computing device 100 may configure the XOT range registers using a model-specific register (MSR) interface of the processor 120. As described above, the computing device 100 may use a range register that is specific to the page size of the XOT memory range. For example, the processor 120 of the computing device 100 may support different range registers for an XOT range that maps to large and/or huge pages (e.g., 4 MB) as compared to an XOT range that maps to small pages (e.g., 4 kB). In some embodiments, in block 320 the computing device 100 may store the XOT code range into the XOT range register(s) using one or more port I/O instructions (PIO) of the processor 120, such as the OUT instruction. After locking the XOT range, the method 300 loops back to block 312 to determine whether additional XOT code images should be loaded.

Referring back to block 312, if no additional XOT code paths should be loaded, the method 300 branches ahead to block 322. In block 322, the computing device 100 may configure one or more port I/O devices of the computing device 100. The computing device 100 may execute one or more port I/O instructions of the processor 120, such as IN and/or OUT, to enable, disable, or otherwise configure one or more components of the computing device 100. For example, the computing device 100 may enable one or more functional blocks of the processor 120, the I/O subsystem 126, or a system-on-a-chip (SoC) of the computing device 100. Thus, an XOT code path may use its secrets to unlock device functionality and control resources across the SoC.

In some embodiments, in block 324 the computing device 100 may transfer one or more secrets stored as an immediate value of an instruction to the PIO device. For example, the computing device 100 may load an immediate value stored in a MOV instruction into a register and then transfer that value using a PIO instruction. The secrets stored as immediate values (e.g., encryption keys, certificates, or other secrets) are included in the XOT code path and are thus protected from unauthorized access. Because the PIO instructions do not rely on memory mappings configured by an operating system (as compared to memory mapped I/O (MMIO)), the transactions using PIO can be trusted. If PIO transactions are intercepted by software (e.g., the OS), those control flow changes will effectively be seen as an interrupted XOT flow and cause the processor's register state to be cleared, as described below in connection with FIG. 5. In some embodiments, in block 326 the computing device 100 may enforce access control to the PIO device from the XOT code path. The computing device 100 may perform any authentication, verification, or other access control procedure. The computing device 100 may enforce access control by enabling and/or disabling the PIO devices as described above. Thus, properly authorized XOT code paths may securely enforce access control to devices and/or functional blocks within the SoC, acting as a secure gateway to devices and preventing unauthorized software and/or malware access.

In block 328, the computing device 100 launches software, such as an operating system or other software components. After launching the additional software, the method 300 is completed. Although illustrated as being executed in the method 300 prior to launching additional software such as an operating system, it should be understood that in some embodiments, the computing device 100 may load additional XOT code paths and/or configure additional PIO devices after launching the additional software. For example, an operating system, driver, and/or application of the computing device 100 may execute a pre-loaded XOT code path to load additional XOT code paths, configure PIO devices, and/or access PIO devices.

Figure 4:
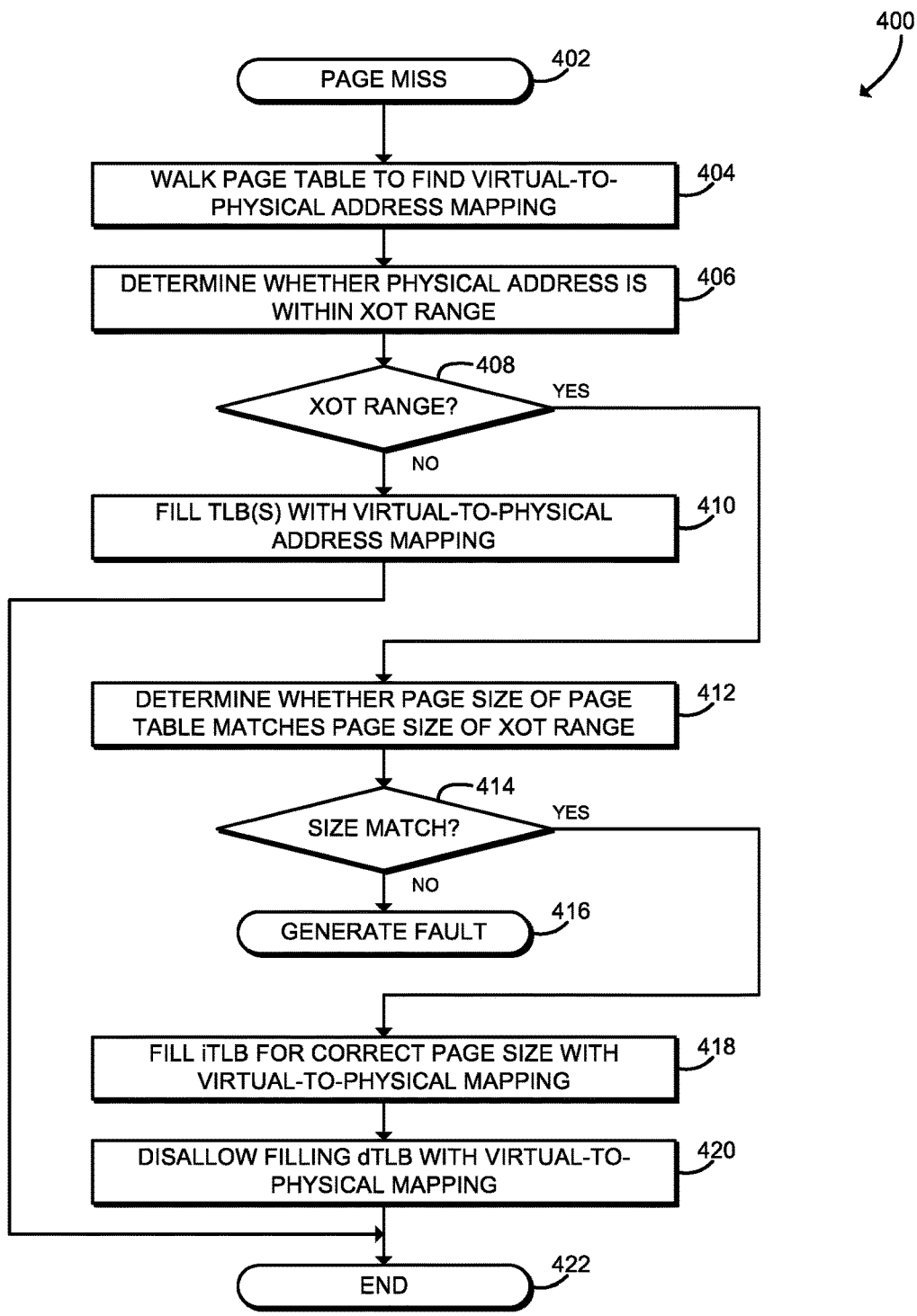
FIG. 4 is a simplified flow diagram of at least one embodiment of a method for a page miss handler that may be executed by the computing device of FIGS. 1-2.

Referring now to FIG. 4, in use, the computing device 100 may execute a method 400 for a page miss handler 210. The method 400 begins with block 402, in which the computing device 100 executes the page miss handler 210 of the processor 120. The computing device 100 executes the page miss handler 210 in response to an attempt to access a virtual memory address that is not included in the iTLB 122 or the dTLB 124. The page miss handler 210 may be embodied as hardware, firmware, and/or microcode of the processor 120 and is thus transparent to software executed by the computing device 100.

In block 404, the page miss handler 210 (PMH) of the computing device 100 walks a page table established in the memory 128 to find a virtual-to-physical address mapping. An operating system (OS) or other control software of the computing device 100 may establish the page table in the memory 128 to define mappings between virtual memory pages and physical memory pages. The address mapping translates a virtual address (also known as a linear address) associated with the page miss to a physical address in the memory 128. The virtual-to-physical address mapping may map between byte-level memory addresses, memory pages, memory segments, or other regions in memory.

In block 406, the computing device 100 determines whether the physical address of the virtual-to-physical address mapping falls within an XOT memory range. For example, the computing device 100 may compare the physical address to one or more XOT range registers that have been set by trusted firmware and/or by trusted XOT code paths as described above in connection with FIG. 3. Additionally or alternatively, in some embodiments the computing device 100 may use a different mechanism to determine whether the physical address lies within a XOT memory range. For example, in some embodiments, a second-level page table established by the computing device 100, such as Extended Page Tables (EPT), may allow for execute only memory permissions that are extended with the transactional notion by adding a PAT memory type or an additional permission bit. In those embodiments, a VMM of the computing device 100 may flexibly allocate and control the loading and measurement of XOT code into the memory 128.

In block 408, the computing device 100 checks whether the physical address is within an XOT memory range. If so, the method 400 branches ahead to block 412, described below. If the physical address is not within the XOT memory range, the method 400 advances to block 410, in which the computing device 100 fills the iTLB 122 and/or the dTLB 124 with the virtual-to-physical address mapping as normal. After filling the iTLB 122 and/or the dTLB 124, the method 400 advances to block 422, in which the page miss handler 210 is completed. Of course, the computing device 100 may also perform any additional operations typically performed by a page miss handler. After completion, the computing device 100 may resume execution of the code that generated the page miss, allowing that code to access data at the physical memory address. Because the physical address is not within an XOT code range, the computing device 100 may execute the code at the physical address by accessing the iTLB 122 and the computing device 100 may access data at the physical address by accessing the dTLB 124.

Referring back to block 408, if the physical address is within an XOT range, the method 400 advances to block 412, in which the computing device 100 determines whether a page size for the physical address stored in the page table matches a page size for the XOT memory range. For example, the iTLB 122 may indicate a page size (e.g., huge, large (4 MB), and/or small (4 kB) page sizes) for each address mapping. Large and small XOT pages may be kept in separate XOT memory ranges, and the page miss handler 210 assures that XOT code from the large page region will only be mapped into large pages in the iTLB 122, that XOT code from the small page region will only be mapped into small pages in the iTLB 122, and so on.

In block 414, the computing device 100 checks whether the page size of the page table matches the page size of the XOT memory range. If so, the method 400 branches ahead to block 418 as described below. If the page sizes do not match, the method 400 advances to block 416, in which the computing device 100 generates a fault indicating incorrect XOT page size mapping. The computing device 100 may perform any appropriate error handling routine in response to the fault, including terminating processes, halting execution, or performing other error handling tasks.

Referring back to block 414, if the page sizes match, the method 400 advances to block 418, in which the computing device 100 fills the iTLB 122 for the correct page size with the virtual-to-physical address mapping. In block 420, the computing device 100 disallows or otherwise prevents the dTLB 124 from being filled with the virtual-to-physical address mapping. After allowing the iTLB 122 to fill and preventing the dTLB 124 from filling, the method 400 advances to block 422, in which the page miss handler 210 is completed. Of course, the computing device 100 may also perform any additional operations appropriate for the page miss handler 210. After completion, the computing device 100 may resume execution of the code that generated the page miss, allowing that code to execute from the physical memory address by accessing the iTLB 122. As the dTLB 124 does not include a mapping to the physical memory address, the code cannot access data at that physical address through the dTLB 124. Thus, by including the address mapping only in the iTLB 122 and not in the dTLB 124, the computing device 100 enforces the execute-only (XO) property of the XOT memory range. Additionally or alternatively, the processor 120 may also perform additional checks, for example assuring that the XOT memory range is mapped only when the processor 120 running in the expected mode (e.g., 32-bit, 64-bit, etc.), assuring that the processor 120 is running in the expected privilege level (e.g., an expected ringlevel), preventing system management mode (SMM) and/or device access to the XOT memory via device direct memory access (DMA), including graphics processor access, or other processor checks.

Figure 5:
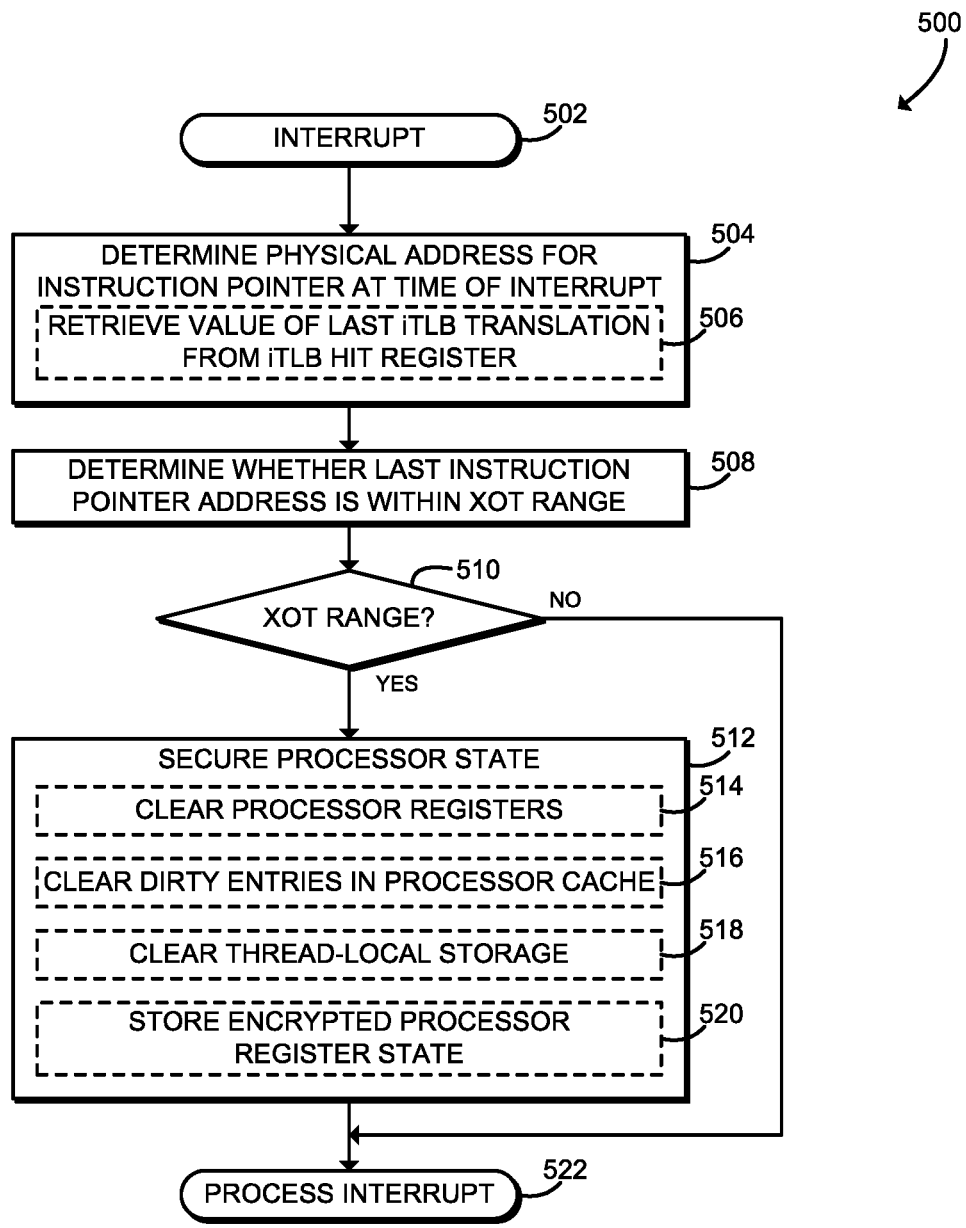
FIG. 5 is a simplified flow diagram of at least one embodiment of a method for interrupt handling that may be executed by the computing device of FIGS. 1-2.

Referring now to FIG. 5, in use, the computing device 100 may execute a method 500 for handling interrupts or other changes to control flow other than branches. The method 500 begins with block 502, in which the computing device 100 executes a handler for an interrupt, fault, exception, or other change to control flow other than a branch. The interrupt handler 224 (or other appropriate handler) may be embodied as hardware, firmware, and/or microcode of the processor 120 and is thus transparent to software executed by the computing device 100.

In block 504, the computing device 100 determines the physical memory address for the instruction pointer (e.g., the RIP, EIP, or other instruction pointer register of the processor 120) at the time of the interrupt. In some embodiments, the computing device 100 may simply read the instruction pointer register. Additionally or alternatively, in some embodiments the computing device 100 may determine the physical memory address, for example, by determining the physical address of the last address translation performed by the iTLB 122. In some embodiments, in block 506 the computing device 100 may retrieve the value of the physical address associated with the last translation performed by the iTLB 122 from an iTLB hit register of the processor 120. The iTLB hit register may be updated with a physical address, frame number, physical page number, or other part of the physical memory address after every successful hit to the iTLB 122.

Figure 6:
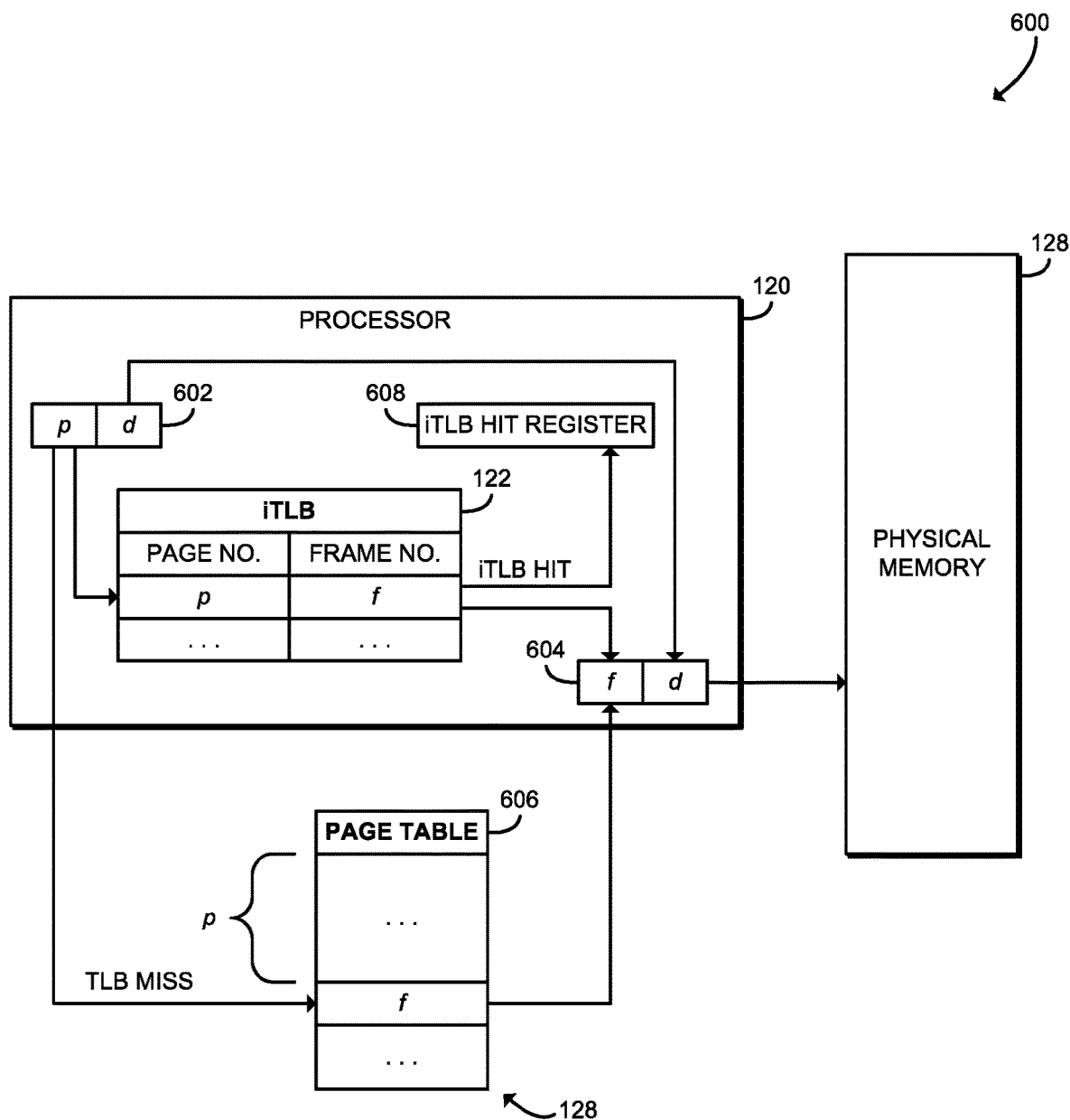
FIG. 6 is a schematic diagram illustrating an instruction translation lookaside buffer (iTLB) hit register that may be maintained by the computing device of FIGS. 1-2.

Referring now to FIG. 6, diagram 600 illustrates one potential technique for determining the physical address of the instruction pointer. The diagram 600 illustrates a virtual address 602 including a page number p and an offset d. As shown, the page number p may be used to index the iTLB 122 to retrieve a frame number f. If the page number p is not found in the iTLB 122, the computing device 100 may generate a page miss, and the page miss handler 210 may walk a page table 606 stored in the memory 128 to retrieve the frame number f, as described further above in connection with FIG. 4. As shown, the frame number f and the offset d may be combined to produce a physical memory address 604, which may be used to retrieve an instruction from the physical memory 128. When the frame number f is produced by a hit from the iTLB 122, the frame number f is stored in an iTLB hit register 608. The iTLB hit register 608 is readable by hardware, firmware, and/or microcode of the processor 120, and can be accessed on an asynchronous change in control flow by the processor 120 to determine if the interrupted control flow was executing from XOT memory. If so, as described further below, the processor 120 may clear all general purpose and extended register state, or encrypt the processor state with an integrity check value and save the state for later resumption by software.

Referring back to FIG. 5, in block 508, the computing device 100 determines whether the physical address of the last translation performed by the iTLB 122 falls within an XOT range. For example, the computing device 100 may compare the physical address to one or more XOT range registers as described above in connection with FIG. 4. In block 510, the computing device 100 checks whether the physical address falls within an XOT memory range. If not, the method 500 branches to block 522 in which the computing device 100 continues processing the interrupt or other asynchronous change in control flow. Referring back to block 510, if the physical address falls within an XOT memory range, the method 500 advances to block 512.

In block 512, the computing device 100 secures the processor state of the processor 120. The computing device 100 may clear, encrypt, save the state to an inaccessible memory region, or otherwise protect one or more registers or other state of the processor 120 to protect the execution of the XOT code path. Securing the processor state prevents interrupting code from accessing internal state of the XOT code path, and in particular prevents an operating system or privileged malware from interrupting an XOT code path to read its sensitive data. In some embodiments, in block 514, the processor 120 may clear the processor registers, for example by setting one or more register values to zero. Thus, in those embodiments any encryption keys, secrets, or other sensitive data generated by the XOT code path and stored in the processor registers is not accessible to interrupting code. Similarly, in some embodiments, in block 516 the processor 120 may clear dirty entries from a cache memory of the processor, such as an L1 cache. Clearing the cache memory may prevent secrets temporarily stored in the cache memory from being accessed from other processors, cores, and/or hardware threads of the computing device 100.

In some embodiments, in block 518 the processor 120 may clear one or more thread-local storage locations in the memory 128. In some embodiments, scratch pad memory may be defined, which may be embodied as thread local memory which can be reliably used by software without worry about adjacent processor core, hardware thread, or other device accesses. For example, thread local storage may be implemented as ranges of physical memory 128 assigned to a particular processor 120 and/or hardware thread. The page miss handler 210 (PMH) would prevent other thread-local data for other processors 120 and/or hardware threads from being used and translated by the dTLB 124. Additionally, the PMH may map thread local storage to a known virtual address range or otherwise the processor 120 can provide an instruction identifying the location of thread local storage virtual addresses. By clearing the thread-local storage when an XOT code path is interrupted, the thread-local storage may be used for temporarily holding secret data. Additionally or alternatively, in some embodiments the scratch pad memory or other thread-local storage may not be cleared and thus may not be used for holding secrets. Instead, the thread-local storage may hold non-secret temporary data and be used for keeping state within a transaction. Additionally or alternatively, in some embodiments the scratch pad memory or other thread-local storage may be accessed using new instructions or via non-memory address spaces, such as the port I/O address space.

In some embodiments, the computing device 100 may write an XOT secret (e.g., a one-time random number, an XOT immediate value, or other secret of the XOT code path) using a secure path into a thread local memory location. For example, the computing device 100 may write the XOT secret using a special register or IN instruction that writes exclusively to thread local memory. The XOT code path may then read out the memory 128 at an assumed virtual address to this same location to verify the secret and, thus, that the virtual memory page mapping (i.e., the dTLB 124 address mapping) is correct. By doing so, the computing device 100 may ensure the dTLB 124 is populated with the correct memory mapping for the duration of the transaction. Thus, this write-through and read-back secret technique can confirm the validity of the dTLB 124 address mapping for the rest of the data page is thread local (and thus prevent the operating system or other software that controls the virtual memory mapping from undermining the XOT program). This same mechanism also allows verification of memory-mapped device memory locations, where the virtual memory address that accesses a device register space can be verified. In that example, the computing device 100 may write the secret to the device with port I/O instructions (e.g., IN or OUT instructions) and then read back the memory through MMIO to confirm the address translation corresponds to the device's memory mapped registers occupying the same page.

In some embodiments, in block 520, the processor 120 may encrypt its registers and associated metadata such as the physical instruction pointer (IP) address or the last branch target. The processor 120 may also calculate an integrity check value (ICV) over the registers and metadata. On restore, software (e.g., the OS) can reload the encrypted register state in the processor 120 and resume execution. In those embodiments, the processor 120 will use a secret to decrypt the register state, check the metadata, and verify the integrity check value before proceeding. One potential embodiment of a method for encrypting and storing the register state is described further below in connection with FIG. 7.

After securing the processor register state, in block 522 the computing device 100 processes the interrupt or other change to control flow. After processing the interrupt flow, the method 500 is completed.

Figure 7:
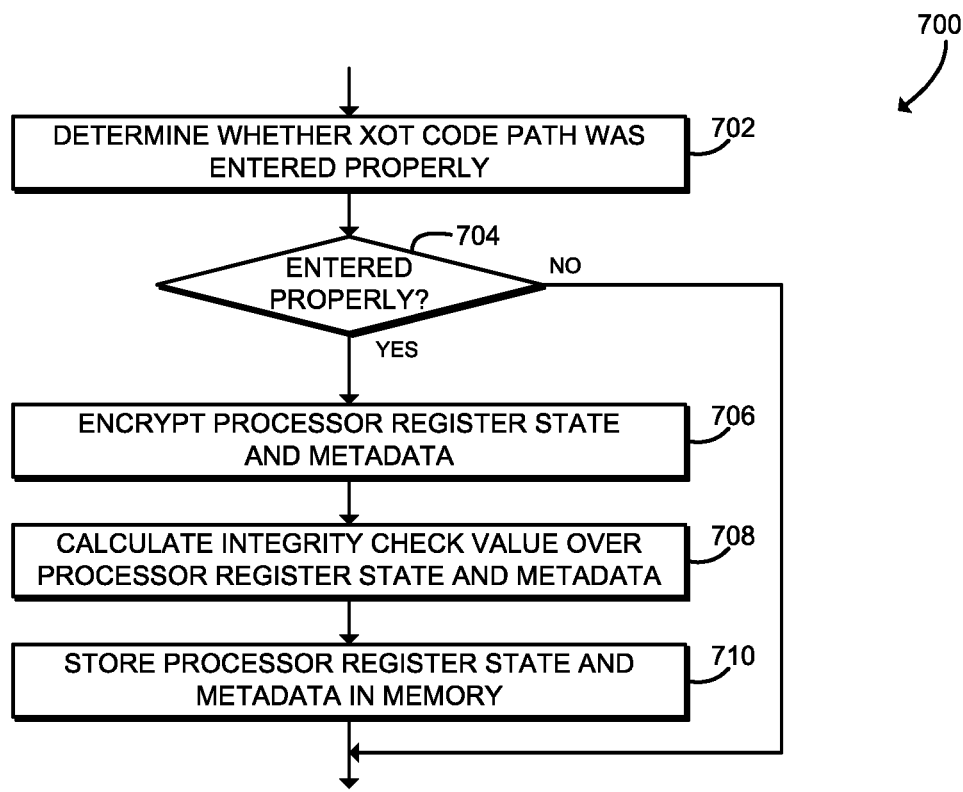
FIG. 7 is a simplified flow diagram of at least one embodiment of a method for encrypting processor register state that may be executed by the computing device of FIGS. 1-2.

Referring now to FIG. 7, in use, the computing device 100 may execute a method 700 for encrypting processor register state. The method 700 may be executed, for example, to secure the register state of the processor 120 while handling an interrupt or other asynchronous change in control flow, as described above in connection with block 520 of FIG. 5. The method 700 begins with block 702, in which the computing device 100 determines whether the current XOT code path was entered properly. The processor 120 may determine, for example, whether the XOT code path was entered properly at an expected XOT offset on the XOT code page. In some embodiments, last branch records (LBRs) or a new processor 120 instruction providing the last branch target (address) may be used to assure they the XOT code path was entered correctly at the correct/expected offset before proceeding and utilizing secret data. Additionally or alternatively, as shown in FIG. 6, the iTLB hit register 608 may directly detect changes from a previous iTLB 122 mapping. A method for handling detected changes in the previous iTLB 122 mapping is described further below in connection with FIG. 9.

In block 704, the computing device 100 checks whether the XOT code path was entered properly. If not, the method 700 is completed. As described above in connection with FIG. 5, the processor state of the processor 120 may be cleared to protect the integrity of the XOT code path, for example by setting one or more register values to zero. Additionally, in some embodiments the computing device 100 may generate one or more faults, exceptions, or other indications that the XOT code path was not entered properly.

Referring back to block 704, if the XOT code path was entered properly, the method 700 advances to block 706, in which the computing device 100 encrypts the processor state of the processor 120 and/or associated metadata. In block 708, the computing device 100 calculates an integrity check value (ICV) over the processor state and/or metadata. For example, the processor 120 may encrypt the contents of one or more registers, translate the instruction pointer to a XOT physical address, and save this information as metadata with an integrity check value (e.g., an HMAC/authenticated secure hash) calculated over the register and metadata to prevent tampering of the contents by software. In block 710, the computing device 100 stores the encrypted processor register state and metadata in the memory 128. Thus, the encrypted register state may be returned to software when the XOT code path is interrupted, and the software may resume execution of the XOT code path at a later time. After encrypting the processor register state, the method 700 is completed. As described above in connection with FIG. 5, the processor state of the processor 120 may be cleared to protect the integrity of the XOT code path, for example by setting one or more register values to zero.

Figure 8:
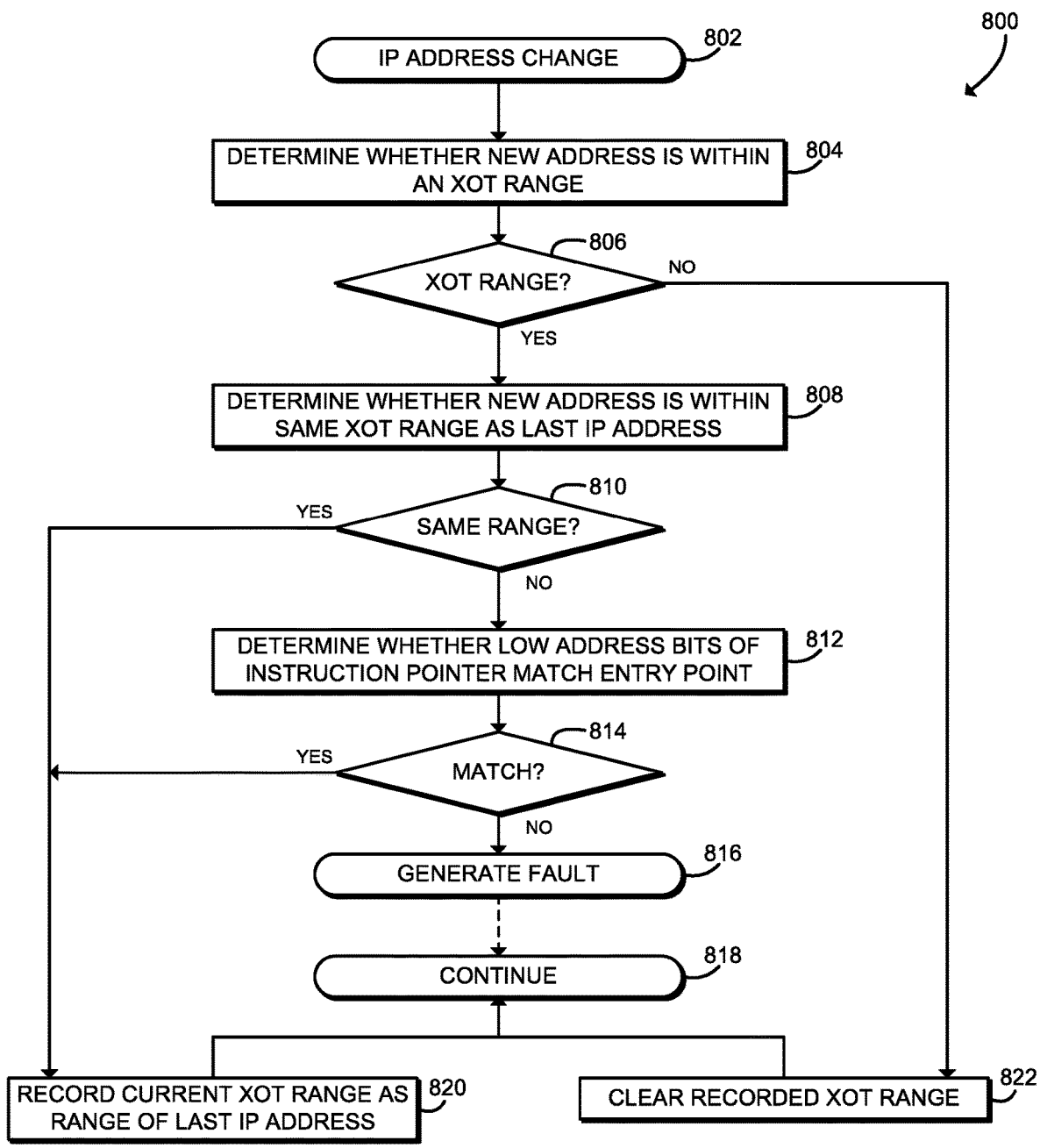
FIG. 8 is a simplified flow diagram of at least one embodiment of a method for entry point verification that may be executed by the computing device of FIGS. 1-2.

Referring now to FIG. 8, in use, the computing device 100 may execute a method 800 for entry point verification. The method 800 begins with block 802, in which the computing device 100 begins executing the method 800 in response to a change in an instruction pointer (IP) address register of the processor 120. Such a change may occur, for example, in response to a change in control flow (e.g., a call or jump instruction) or in response to execution of the processor 120 moving to a new address in the memory 128. The operations of the method 800 may be embodied as hardware, firmware, and/or microcode of the processor 120 and thus may be transparent to software executed by the computing device 100. In some embodiments, the method 800 may be executed in connection with a mapping change handler 220 and/or one or more iTLB access handlers 222 as described further below in connection with FIGS. 9-13.

In block 804, the computing device 100 determines whether the new address of the instruction pointer register is within an XOT memory range. For example, the computing device 100 may compare the physical address to one or more XOT range registers as described above in connection with FIGS. 4 and 5. Continuing the example shown in FIG. 6, the computing device may determine whether the frame number f is within an XOT range. In block 806, the computing device 100 checks whether the physical address is within an XOT memory range. If the physical address is not within an XOT memory range, the method 800 branches ahead to block 822, described further below. If the physical address is within an XOT range, the method 800 advances to block 808.

In block 808, the computing device 100 determines whether the new instruction pointer register address is within the same XOT memory range as the last IP address. In other words, the computing device 100 determines whether execution has jumped to a new XOT memory range. The computing device 100 may determine, for example, whether the current XOT range matches a previously recorded XOT range. In block 810, the computing device 100 checks whether the new instruction pointer register address is within the same XOT memory range as the last IP address. If so, the method 800 branches ahead to block 820, in which the computing device 100 records the current XOT memory range as the range of the last instruction pointer register address. Thus, on subsequent instruction pointer address changes, the new XOT memory range may be compared to the recorded XOT memory range. After recording the XOT memory range, the method 800 proceeds to block 818, in which the computing device 100 continues execution. Thus, the computing device 100 may continue executing an XOT code path within the same XOT memory range. Referring back to block 810, if the new XOT memory range is not within the same XOT memory range as the last IP address (or if the last IP address was not within an XOT memory range), the method 800 advances to block 812.

In block 812, the computing device 100 determines whether the low address bits of the instruction pointer (e.g., the RIP, EIP, or other instruction pointer register of the processor 120) match a predefined entry point. When execution moves to an XOT range mapping, the computing device 100 expects that the XOT range will be entered at a specific entry point or offset. For example, as shown in FIG. 6, the bits of the offset d of the address 604 may be expected to be 16 bytes from the start of a page whenever the frame number f of the physical address 604 changes to a new value within the XOT range. In block 814, the computing device 100 checks whether the low address bits match the predefined entry point. If so, the method 800 branches to block 820, in which the computing device 100 continues execution as described above. Thus, the computing device 100 allows execution of an XOT code path that begins at a predefined offset.

Referring back to block 814, if the low address bits do not match the predefined entry point, the method 800 advances to block 816, in which the processor 120 generates a fault. Generating a fault if execution does not start at the predefined entry point thus forces an XOT code path to start executing at the entry point (e.g., 16 bytes into the page). An adversary may not begin execution of an XOT page at any other offset, which may further protect the XOT code path. After generating the fault, in some embodiments execution of the method 800 may continue with block 818, in which the computing device 100 continues execution. For example, the computing device 100 may execute an error handler routine or other procedure in response to the fault.

Referring back to block 806, if the new instruction pointer register address is not within an XOT memory range, the method 800 branches ahead to block 822, in which the computing device 100 clears the recorded XOT memory range. Thus, upon the next IP address change that enters an XOT region, the computing device 100 will ensure that execution begins at a predefined entry point. After clearing the recorded XOT memory range, the method 800 advances to block 818, in which the computing device 100 continues execution. After generating a fault and/or continuing execution, the method 800 is completed.

Figure 9:
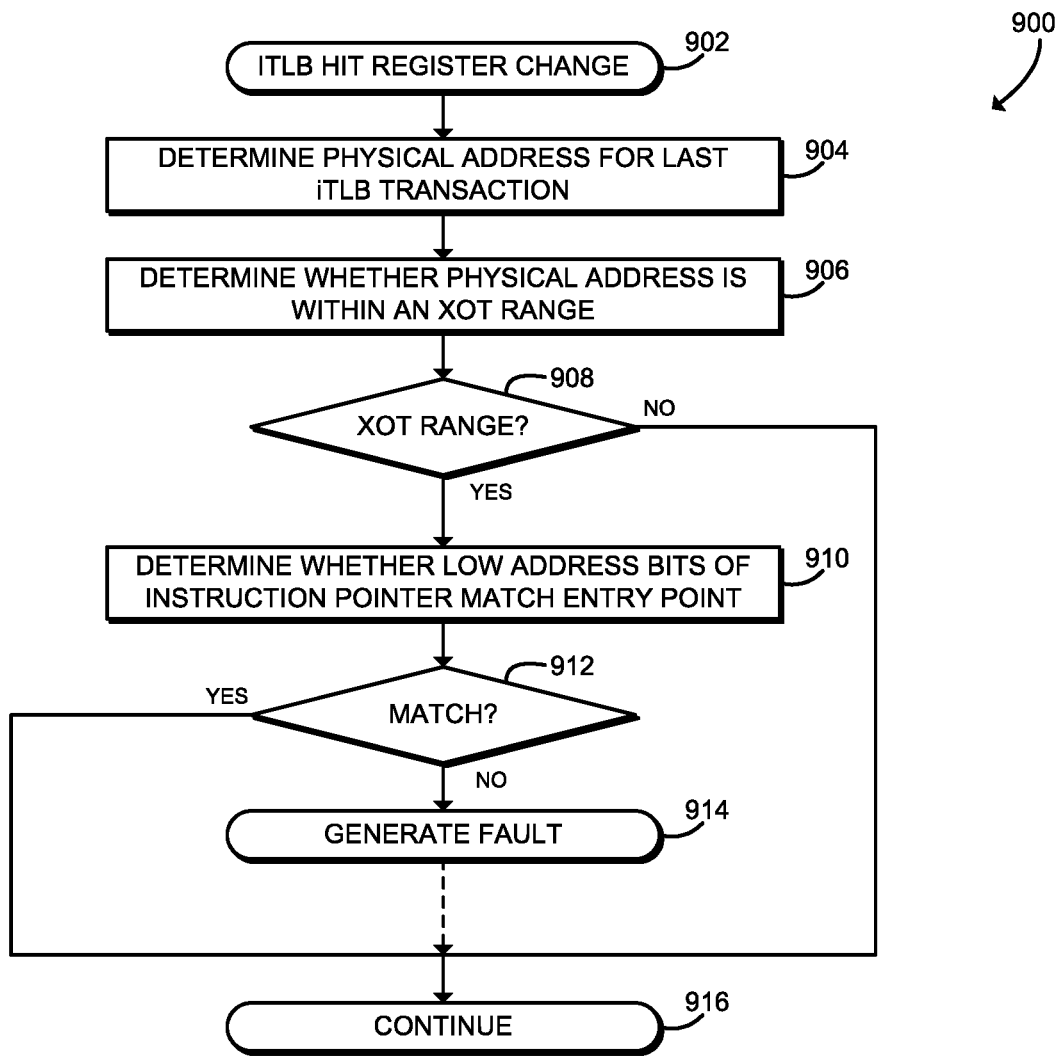
FIG. 9 is a simplified flow diagram of at least one embodiment of a method for an iTLB mapping change handler that may be executed by the computing device of FIGS. 1-2.

Referring now to FIG. 9, in use, the computing device 100 may execute a method 900 for an iTLB mapping change handler 220. The method 900 begins with block 902, in which the computing device 100 executes the mapping change handler 220 of the processor 120. The computing device 100 may execute the mapping change handler 220 in response to a change in the value stored in the iTLB hit register 608. Such a change may occur, for example, in response to a change in control flow (e.g., a call or jump instruction) or in response to execution moving to a new physical page or other region in the memory 128. The mapping change handler 220 may be embodied as hardware, firmware, and/or microcode of the processor 120 and is thus transparent to software executed by the computing device 100.

In block 904, the computing device 100 determines the physical address for the last iTLB 122 translation. The computing device 100 may determine the entire physical address or a part of the physical address, such as a physical page number, frame number, segment number, or other part of the address. For example, as shown in FIG. 6, the computing device 100 may query the iTLB hit register 608 to determine the frame number f of the last iTLB 122 translation.

In block 906, the computing device 100 determines whether the physical address of the last iTLB 122 translation is within an XOT memory range. For example, the computing device 100 may compare the physical address to one or more XOT range registers as described above in connection with FIGS. 4 and 5. Continuing the example shown in FIG. 6, the computing device may determine whether the frame number f is within an XOT range. In block 908, the computing device 100 checks whether the physical address is within an XOT memory range. If the physical address is not within an XOT memory range, the method 900 branches ahead to block 916, in which the computing device 100 continues execution. If the physical address is within an XOT range, the method 900 advances to block 910.

In block 910, the computing device 100 determines whether the low address bits of the instruction pointer (e.g., the RIP, EIP, or other instruction pointer register of the processor 120) match a predefined entry point. When execution moves to an XOT range mapping, the computing device 100 expects that the XOT range will be entered at a specific entry point or offset. For example, as shown in FIG. 6, the bits of the offset d of the address 604 may be expected to be 16 bytes from the start of a page whenever the frame number f of the physical address 604 changes to a new value within the XOT range.

In block 912, the computing device 100 checks whether the low address bits match the predefined entry point. If so, the method 900 branches to block 916, in which the computing device 100 continues execution. Thus, the computing device 100 allows execution of an XOT code path that begins at a predefined offset. The iTLB mapping change handler 220 is not executed until the next change to the iTLB hit register 608, and thus the remainder of the memory page may continue executing according to the XOT program defined control flow within the page (as long as it executes on the same page). For example, as shown in FIG. 6, if the frame number f of the physical address 604 does not change since the last iTLB 122 hit, then no entry point check is needed on the offset d bits.

Referring back to block 912, if the low address bits do not match the predefined entry point, the method 900 advances to block 914, in which the processor 120 generates a fault. Generating a fault if execution does not start at the predefined entry point thus forces an XOT code path to start executing at the entry point (e.g., 16 bytes into the page). An adversary may not begin execution of an XOT page at any other offset, which may further protect the XOT code path. After generating the fault, in some embodiments execution of the method 900 may continue with block 916, in which the computing device 100 continues execution. For example, the computing device 100 may execute an error handler routine or other procedure in response to the fault. After generating a fault and/or continuing execution, the method 900 is completed.

Figure 10:
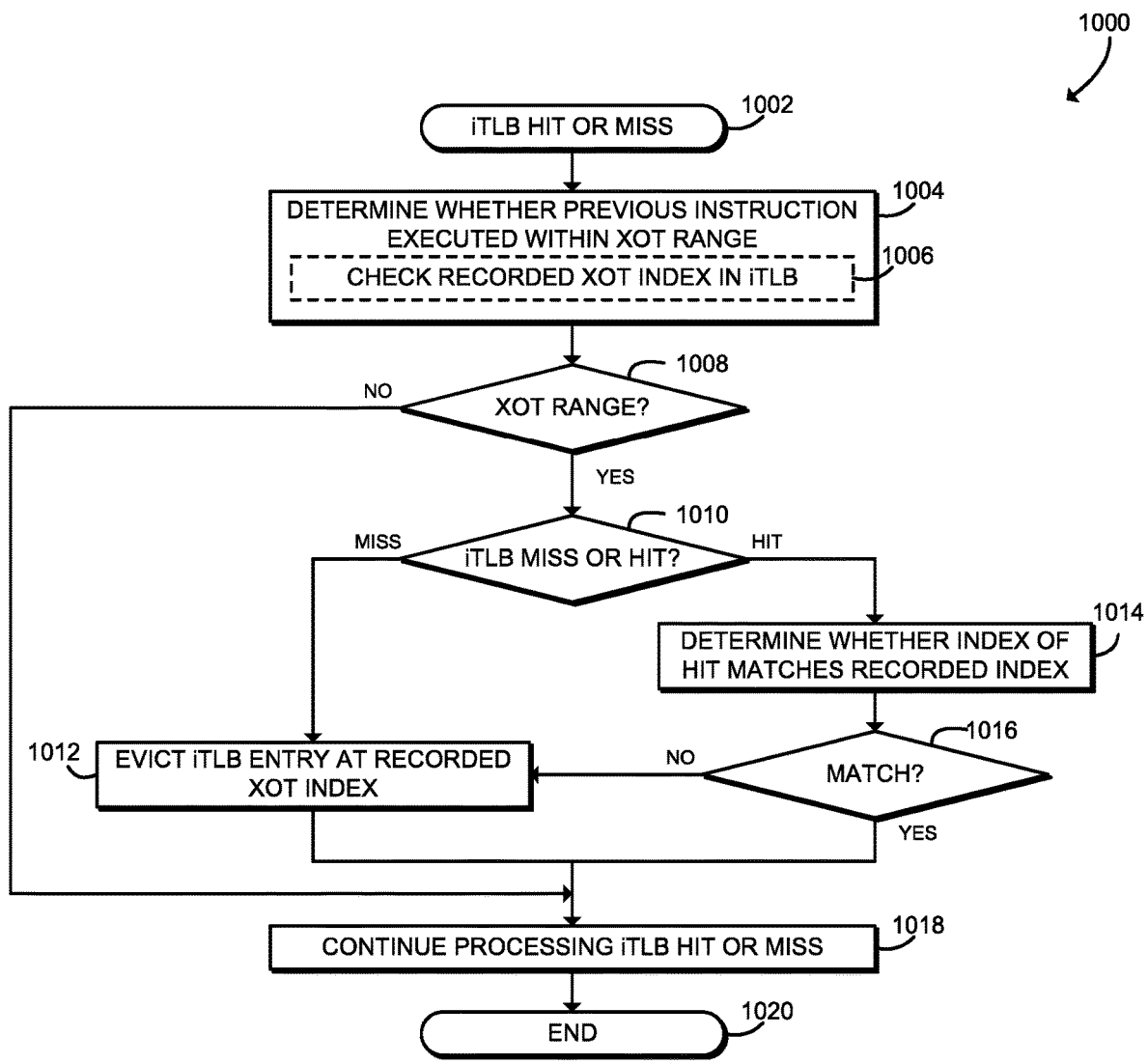
FIG. 10 is a simplified flow diagram of at least one embodiment of a method for an iTLB hit or miss handler that may be executed by the computing device of FIGS. 1-2.

Referring now to FIG. 10, in use, the computing device 100 may execute a method 1000 for an iTLB hit or miss handler 222. The method 1000 begins with block 1002, in which the computing device 100 executes an iTLB hit or miss handler 222 of the processor 120. The computing device 100 executes the iTLB hit or miss handler 222 in response to an attempt to access a virtual memory address through the iTLB 122. The iTLB hit or miss handler 222 is executed both when the virtual memory address is included in the iTLB 122 (a hit) and when the virtual memory address is not included in the iTLB 122 (a miss). The iTLB hit or miss handler 222 may be embodied as hardware, firmware, and/or microcode of the processor 120 and is thus transparent to software executed by the computing device 100.

In block 1004, the computing device 100 determines whether a previous instruction was executed by the processor 120 from within an execute only transactional (XOT) memory range. The computing device 100 may use any appropriate technique to determine whether the previous instruction was executed from an XOT memory range. In some embodiments, in block 1006, the computing device 100 checks a recorded XOT index associated with the iTLB 122. As described further below in connection with FIG. 11, when a virtual-to-physical address mapping within an XOT range is added to the iTLB 122, the processor 120 may record the index of the newly added entry in the iTLB 122 as the XOT index. The computing device 100 may check whether the entry in the iTLB 122 at the XOT index is valid (e.g., has not been evicted) to determine whether the last instruction executed from within an XOT range. In block 1008, the computing device 100 checks whether the previous instruction was executed by the processor 120 from within an XOT memory range. If not, the method 1000 branches ahead to block 1018 to continue processing the iTLB hit or miss as described further below. If the previous instruction was executed from an XOT memory range, the method 1000 advances to block 1010.

In block 1010, the computing device 100 determines whether an iTLB miss or an iTLB hit is being handled. If an iTLB hit is being handled, the method 1000 branches to block 1014, described below. If an iTLB miss is being handled, the method 1000 branches to block 1012. In block 1012, the computing device 100 evicts the entry in the iTLB 122 at the recorded XOT index. Thus, the computing device 100 evicts the entry in the iTLB 122 corresponding to the XOT range of the previously executed instruction, which will cause future attempts to access that XOT range to cause an iTLB miss. After evicting the iTLB 122 entry, the method 1000 advances to block 1018 to continue processing the iTLB miss, as described further below.

Referring back to block 1010, if an iTLB hit is being handled, the method 1000 branches to block 1014, in which the computing device 100 determines whether the index in the iTLB 122 of the iTLB hit matches the recorded XOT index. In other words, the computing device 100 determines whether the instruction currently being executed is from the same XOT range as the previously executed instruction. In block 1016, the computing device 100 checks whether the index of the iTLB hit matches the recorded XOT index. If so, the method 1000 advances to block 1018 to continue processing the iTLB hit, as described further below. If the index of the iTLB hit does not match the recorded XOT index, the method 1000 branches to block 1012, in which the computing device 100 evicts the iTLB entry for the recorded XOT index. Thus, after the computing device 100 begins executing a new XOT range, any attempts to access the previous XOT range will cause an iTLB miss. After evicting the iTLB 122 entry, the method 1000 advances to block 1018 to continue processing the iTLB hit.

In block 1018, the computing device 100 continues processing the iTLB hit or miss. The computing device 100 may, for example, fill the iTLB 122, access a virtual-to-physical address mapping entry in the iTLB 122, or perform other operations appropriate for an iTLB 122 hit or an iTLB 122 miss. In particular, in response to an iTLB 122 miss, the computing device 100 may verify that any XOT range added to the iTLB 122 is entered at a valid entry point. One potential embodiment of a method to verify that the XOT range is entered at a valid entry point is described below in connection with FIG. 11. In block 1020, the iTLB hit or miss handler 222 is completed. Of course, the computing device 100 may also perform any additional operations appropriate for an iTLB hit or miss handler 222, including enforcing the execute-only property of the XOT memory ranges.

Figure 11:
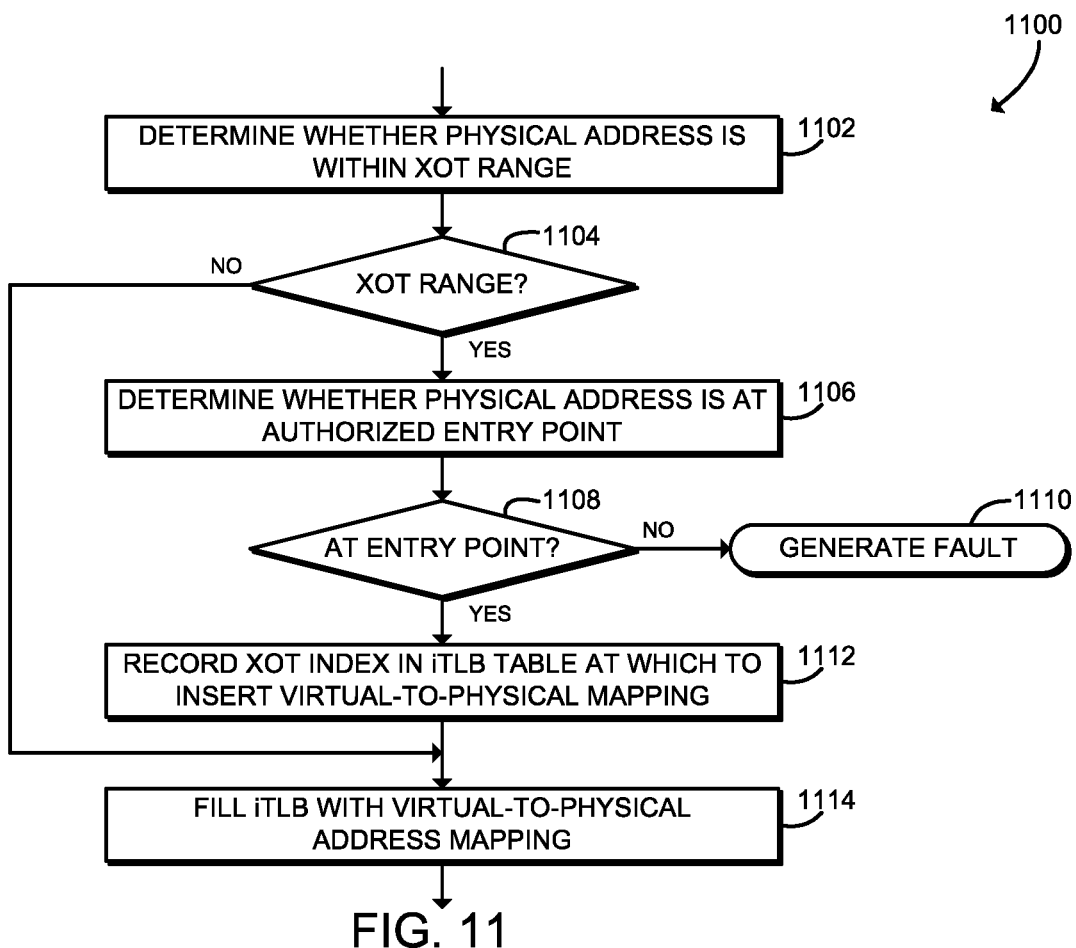
FIG. 11 is a simplified flow diagram of at least one embodiment of a method for processing an iTLB miss that may be executed in connection with the method of FIG. 10.

Referring now to FIG. 11, in use, the computing device 100 may execute a method 1100 for processing an iTLB miss. The method 1100 may be executed, for example, by the iTLB hit or miss handler 222 of the processor 120 in connection with the block 1018 of FIG. 10. The method 1100 begins with block 1102, in which the computing device 100 determines whether the physical address of the virtual-to-physical address mapping falls within an XOT memory range. For example, the computing device 100 may compare the physical address to one or more XOT range registers that have been set by trusted firmware and/or by trusted XOT code paths as described above in connection with FIG. 3. The computing device 100 may determine the virtual-to-physical address mapping by walking one or more page tables as described above in connection with block 404 of FIG. 4. In block 1104, the computing device 100 checks whether the physical address is within an XOT memory range. If not, the method 1100 branches ahead to block 1114, described below. If the physical address is within an XOT memory range, the method 1100 advances to block 1106.

In block 1106, the computing device 100 determines whether the physical address is at an authorized entry point within the XOT range. The computing device 100 may, for example, determine whether the low address bits of the instruction pointer (e.g., the RIP, EIP, or other instruction pointer register of the processor 120) matches a predefined entry point or offset. In block 1108, the computing device 100 checks whether the physical address is at a predefined entry point. If not, the method 1100 branches to block 1110, in which the processor 120 generates a fault. Generating a fault if the instruction pointer does not start at the predefined entry point thus forces an XOT code path to start executing at the entry point (e.g., 16 bytes into the page). An adversary may not begin execution of an XOT page at any other offset, which may further protect the XOT code path.

Referring back to block 1108, if the physical address is at a predefined entry point, the method 1100 advances to block 1112, in which the computing device 100 records the index in the iTLB 122 at which a new virtual-to-physical address mapping will be inserted. As described above in connection with FIG. 10, the XOT index may be used to determine whether a previous instruction executed from an XOT range.

In block 1114, the computing device 100 fills the iTLB 122 with the virtual-to-physical address mapping. In particular, as described above in connection with block 1112, for an XOT range, the computing device 100 may insert a new entry with the virtual-to-physical address mapping into the iTLB 122 at the recorded XOT index. Thus, after filling the iTLB 122 the computing device 100 may execute instructions from the associated physical address. After filling the iTLB 122, the method 1100 is completed.

Figure 12:
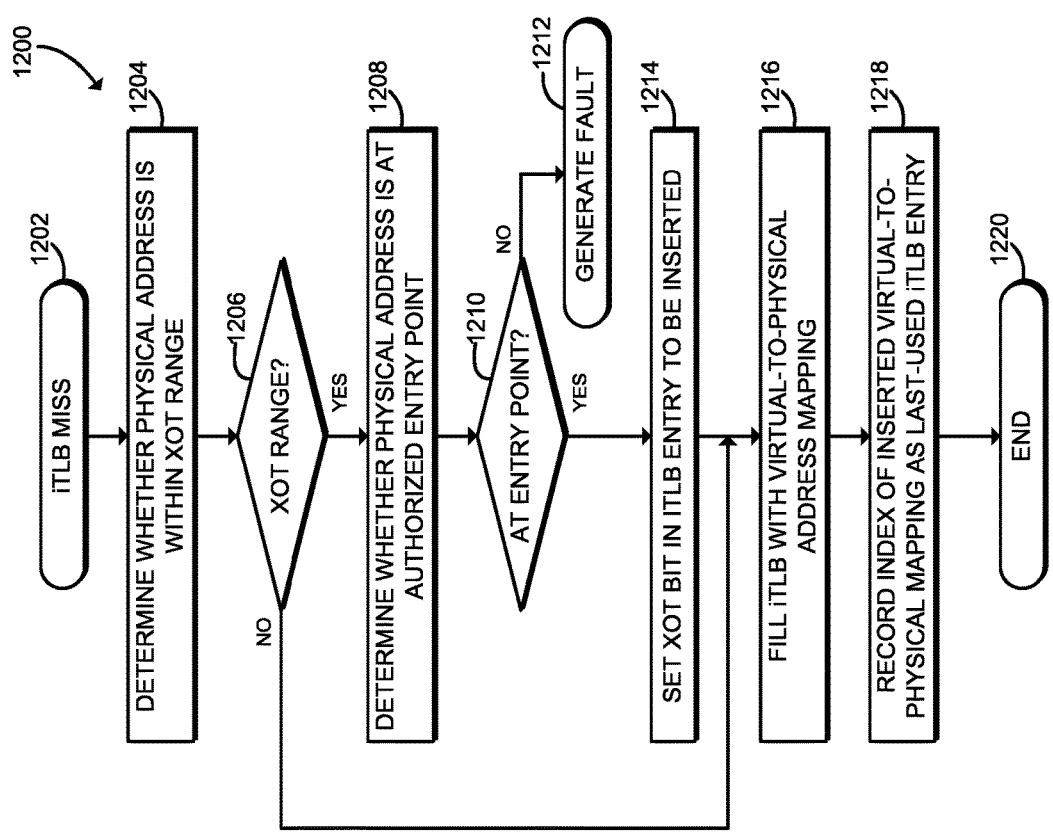
FIG. 12 is a simplified flow diagram of at least one embodiment of a method for an iTLB miss handler that may be executed by the computing device of FIGS. 1-2.

Referring now to FIG. 12, in use, the computing device 100 may execute a method 1200 for an iTLB miss handler 222. The method 1200 may be executed by a computing device 100 that also executes an iTLB hit handler 222 as described below in connection with FIG. 13. The method 1200 begins with block 1202, in which the computing device 100 executes an iTLB miss handler 222 of the processor 120. The computing device 100 executes the iTLB miss handler 222 in response to an attempt to access a virtual memory address that is not included in the iTLB 122 (a miss). The iTLB miss handler 222 may be embodied as hardware, firmware, and/or microcode of the processor 120 and is thus transparent to software executed by the computing device 100.

In block 1204, the computing device 100 determines whether the physical address of the virtual-to-physical address mapping falls within an XOT memory range. For example, the computing device 100 may compare the physical address to one or more XOT range registers that have been set by trusted firmware and/or by trusted XOT code paths as described above in connection with FIG. 3. The computing device 100 may determine the virtual-to-physical address mapping by walking one or more page tables as described above in connection with block 404 of FIG. 4. In block 1206, the computing device 100 checks whether the physical address is within an XOT memory range. If not, the method 1200 branches ahead to block 1216, described below. If the physical address is within an XOT memory range, the method 1200 advances to block 1208.

In block 1208, the computing device 100 determines whether the physical address is at an authorized entry point within the XOT range. The computing device 100 may, for example, determine whether the low address bits of the instruction pointer (e.g., the RIP, EIP, or other instruction pointer register of the processor 120) matches a predefined entry point or offset. In block 1210, the computing device 100 checks whether the physical address is at a predefined entry point. If not, the method 1200 branches to block 1212, in which the processor 120 generates a fault. Generating a fault if the instruction pointer does not start at the predefined entry point thus forces an XOT code path to start executing at the entry point (e.g., 16 bytes into the page). An adversary may not begin execution of an XOT page at any other offset, which may further protect the XOT code path.

Referring back to block 1210, if the physical address is at a predefined entry point, the method 1200 advances to block 1214, in which the computing device 100 sets an XOT bit in the iTLB 122 entry to be inserted for the current virtual-to-physical mapping. As described further below, the XOT bit may be used to determine whether an iTLB 122 entry is associated with an XOT memory range.

In block 1216, the computing device 100 fills the iTLB 122 with the virtual-to-physical address mapping. Thus, after filling the iTLB 122 the computing device 100 may execute instructions from the associated physical address. In block 1218, the computing device 100 records in the index of the inserted virtual-to-physical mapping as a last-used iTLB entry. The computing device 100 may record the index, for example, in one or more model-specific registers or other storage locations of the processor 120. In block 1220, the iTLB miss handler 222 is completed. The computing device 100 may resume execution of code using the virtual-to-physical mapping newly added to the iTLB 122.

Figure 13:
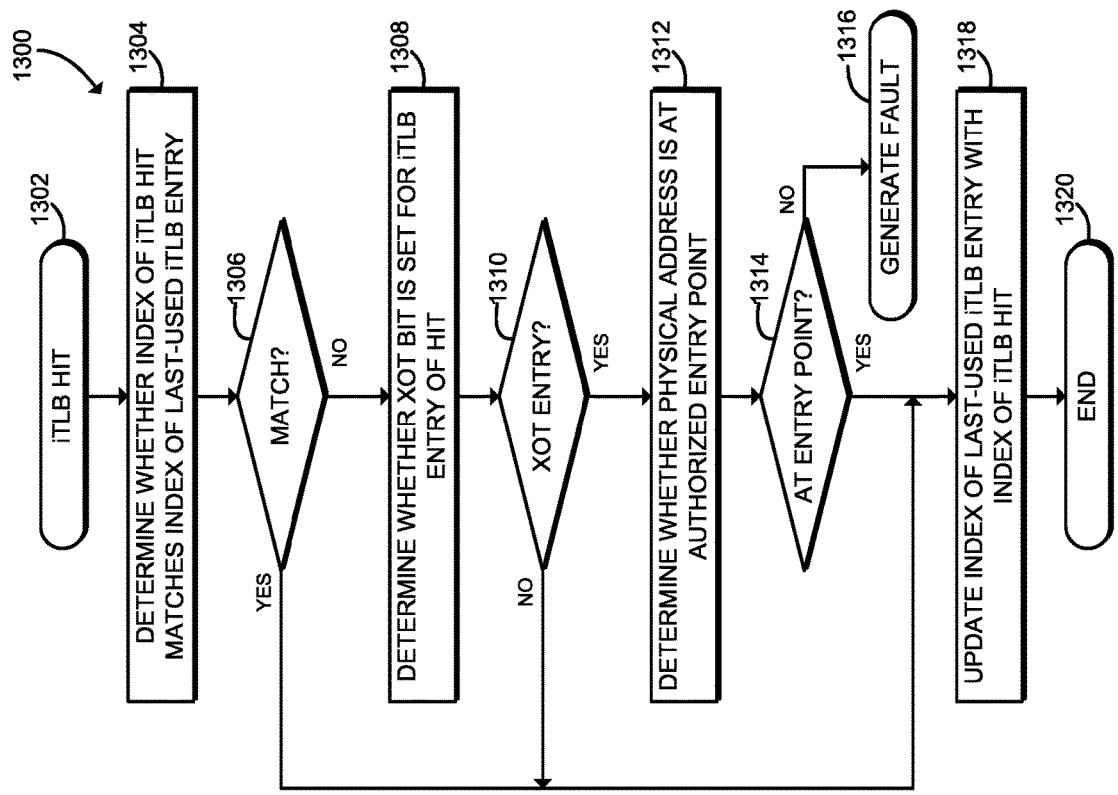
FIG. 13 is a simplified flow diagram of at least one embodiment of a method for an iTLB hit handler that may be executed by the computing device of FIGS. 1-2.

Referring now to FIG. 13, in use, the computing device 100 may execute a method 1300 for an iTLB hit handler 222. The method 1300 may be executed by a computing device 100 that also executes an iTLB miss handler 222 as described above in connection with FIG. 12. The method 1300 begins with block 1302, in which the computing device 100 executes an iTLB hit handler 222 of the processor 120. The computing device 100 executes the iTLB hit handler 222 in response to an attempt to access a virtual memory address that is included in the iTLB 122 (a hit). The iTLB hit handler 222 may be embodied as hardware, firmware, and/or microcode of the processor 120 and is thus transparent to software executed by the computing device 100.

In block 1304, the computing device 100 determines whether the index of the iTLB 122 hit matches the index of the last-used iTLB entry. As described above in connection with FIG. 12, the computing device 100 may record the index of the last-used iTLB entry when the iTLB 122 is filled in response to an iTLB miss. The computing device 100 may record the index, for example, in one or more model-specific registers or other storage locations of the processor 120. In block 1306, the computing device 100 checks whether the index of the iTLB hit matches the index of the last-used iTLB entry. If so, the method 1300 branches ahead to block 1318, described below. If the index of the iTLB hit does not match the index of the last-used iTLB entry, the method 1300 advances to block 1308.

In block 1308, the computing device 100 determines whether the XOT bit is set in the iTLB 122 entry of the iTLB hit. In other words, the computing device 100 determines whether the iTLB entry of the iTLB hit references an XOT memory range. In block 1310, the computing device 100 checks whether the iTLB hit is an XOT entry (that is, whether the XOT bit is set for the iTLB entry of the iTLB hit). If not, the method 1300 branches ahead to block 1318, described below. If the iTLB hit references an XOT entry in the iTLB 122, the method 1300 advances to block 1312.

In block 1312, the computing determines whether the physical address is at an authorized entry point within the XOT range. The computing device 100 may, for example, determine whether the low address bits of the instruction pointer (e.g., the RIP, EIP, or other instruction pointer register of the processor 120) matches a predefined entry point or offset. In block 1314, the computing device 100 checks whether the physical address is at a predefined entry point. If not, the method 1300 branches to block 1316, in which the processor 120 generates a fault. Generating a fault if the instruction pointer does not start at the predefined entry point thus forces an XOT code path to start executing at the entry point (e.g., 16 bytes into the page). An adversary may not begin execution of an XOT page at any other offset, which may further protect the XOT code path. Referring back to block 1314, if the physical address is at a predefined entry point, the method 1300 advances to block 1318.

In block 1318, the computing device 100 updates the last-used iTLB entry with the index of the current iTLB hit. After updating the last-used iTLB entry, the method 1300 advances to block 1320, in which the iTLB hit handler 222 is completed. The computing device 100 may continue execution of code using the virtual-to-physical mapping of the iTLB hit.

Figure 14:
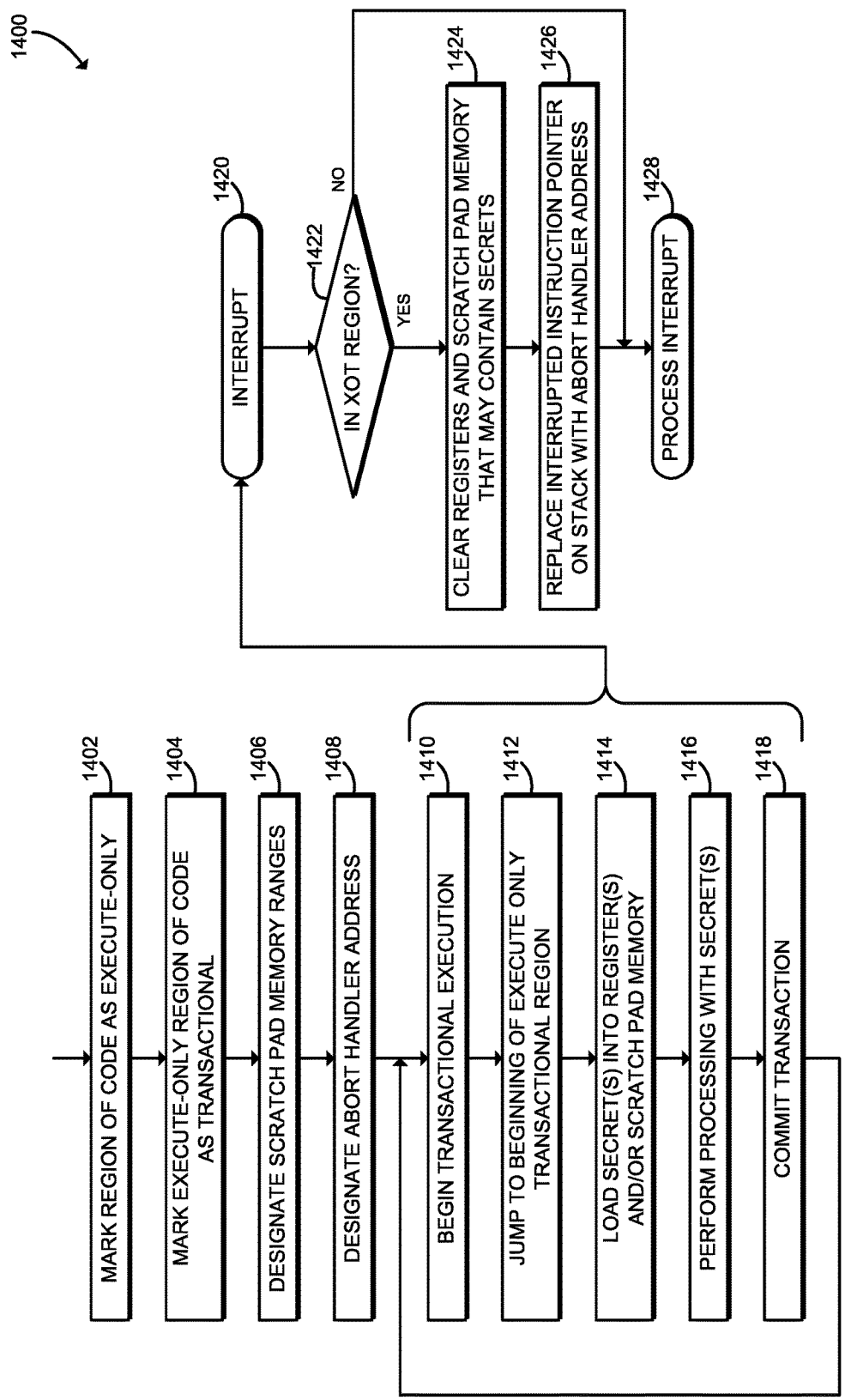
FIG. 14 is a simplified flow diagram of at least one embodiment of a method for software-based execute only transactional memory that may be executed by the computing device of FIGS. 1-2.

Referring now to FIG. 14, in use, the computing device 100 may execute a method 1400 for software-based execute only transactional memory execution. The method 1400 may be executed by a software security monitor of the computing device 100, which may be embodied as part or all of an operating system, virtual machine monitor, or other supervisory software of the computing device 100. The method 1400 begins with block 1402, in which the computing device 100 marks a region of code as execute-only. The region of code includes one or more secret values as well as associated code to process the secrets. For example, a security monitor using Intel IA-32 segmentation may mark any code segment that covers the code region as execute-only and exclude the code region from all data segments.

In block 1404, the computing device 100 marks the execute-only code region as a transactional region. The computing device 100 may use any appropriate technique to mark the code region as transactional. In block 1406, the computing device 100 may designate one or more ranges of the memory 128 as scratch pad memory. As described above, scratch pad memory may be embodied as thread local memory which can be reliably used by software without worry about adjacent processor core, hardware thread, or other device accesses. As described below, by clearing the thread-local storage when an XOT code path is interrupted, the thread-local storage may be used for temporarily holding secret data. In block 1408, the computing device 100 designates an abort handler address. As described below, the abort handler may be called in response to an interrupt, exception, or other asynchronous change in control flow. After designating the abort handler address, initialization may be completed, and the computing device 100 may begin transactional execution of the XOT code ranges. Of course, it should be understood that the initialization functions of blocks 1402, 1404, 1406, 1408 may be performed at other times and in any appropriate order.

In block 1410, the computing device 100 begins transactional execution. The computing device 100 may execute in a software-based transaction, without invoking hardware transactional memory support of the processor 120. In block 1412, the computing device 100 jumps to the beginning of the XOT code range.

In block 1414, the computing device 100 loads one or more secrets from the XOT code range into registers and/or scratch pad memory. For example, the computing device 100 may execute one or more instructions that include the secret values as immediate values. The computing device 100 may also perform associated control flow and mode checks. The computing device 100 may, for example, load a random secret into dynamic storage using a MOV instruction that will be checked upon commit of the transaction to verify that the XOT range has not been invoked at a different starting address or to otherwise deal with control flow threats.

In block 1416, the computing device 100 performs processing using the loaded secrets. The computing device 100, for example, may execute the XOT code path to process the secrets. In block 1418, the computing device 100 commits the transaction. During execution, intermediate values processed by the transaction (e.g., secrets) are not visible to other threads. Committing the transaction may make the results of the transaction visible to other threads and may allow the transaction to prevent unauthorized access to secrets.

As shown in FIG. 14, if an interrupt, fault, exception, or other asynchronous change in control flow occurs, execution of the method 1400 may jump to block 1420, in which the computing device 100 executes a handler for the interrupt, fault, exception, or other asynchronous change to control flow. The interrupt handler of method 1400 may be embodied as part of the security monitor of the computing device 100. In block 1422, the computing device 100 determines whether the interrupted code was executing within an XOT range. If not, the method 1400 branches ahead to block 1428, in which the computing device 100 continues processing the interrupt or other asynchronous change in control flow. If the interrupted code was executing within an XOT range, the method 1400 proceeds to block 1424.

In block 1424, the computing device 100 clears the processor registers and scratch pad memory that may contain secrets. Clearing the registers and scratch pad memory prevents interrupting code from accessing internal state of the XOT code path. In block 1426, the computing device 100 replaces the interrupted instruction pointer on the stack with the abort handler address. Thus, after completion of the interrupt handler, the processor 120 may return to the abort handler, which will perform operations required after the current transaction is aborted, such as retrying the transaction. After replacing the interrupted instruction pointer, the method 1400 advances to block 1428, in which the computing device 100 continues processing the interrupt or other asynchronous change in control flow.

It should be appreciated that, in some embodiments, the methods 300, 400, 500, 700, 800, 900, 1000, 1100, 1200, and/or 1300 may be embodied as various instructions stored on a computer-readable media, which may be executed by the processor 120, a peripheral device 134, and/or other components of the computing device 100 to cause the computing device 100 to perform the corresponding method 300, 400, 500, 700, 800, 900, 1000, 1100, 1200, and/or 1300. The computer-readable media may be embodied as any type of media capable of being read by the computing device 100 including, but not limited to, the memory 128, the data storage device 130, a local memory of the processor 120, firmware or microcode of the processor 120, other memory or data storage devices of the computing device 100, portable media readable by a peripheral device 134 of the computing device 100, and/or other media.

EXAMPLES

Illustrative examples of the technologies disclosed herein are provided below. An embodiment of the technologies may include any one or more, and any combination of, the examples described below.

Example 1 includes a computing device for secure code execution, the computing device comprising: an execute only module to configure an execute only transactional range of a memory of the computing device, wherein the execute only transactional range cannot be read or written as data; and a transactional module to (i) determine, in response to a change of control flow other than a branch, whether a last instruction pointer physical address of a processor of the computing device is within the execute only transactional range, and (ii) secure a processor state of the processor in response to a determination that the last instruction pointer physical address is within the execute only transactional range.

Example 2 includes the subject matter of Example 1, and further comprising: a code management module to (i) execute a reset vector and (ii) load an execute only transactional code image into the execute only transactional range of the memory in response to execution of the reset vector; wherein to configure the execute only transactional range of the memory comprises to configure the execute only transactional range in response to a loading of the execute only transactional code image Example 3 includes the subject matter of any of Examples 1 and 2, and wherein to configure the execute only transactional range of the memory comprises to write to a set-once range register of the processor.

Example 4 includes the subject matter of any of Examples 1-3, and wherein to configure the execute only transactional range of the memory further comprises to determine the set-once range register based on a page size of the execute only transactional range of the memory.

Example 5 includes the subject matter of any of Examples 1-4, and wherein: the code management module is further to measure the execute only transactional code image in response to the loading of the execute only transactional code image; wherein to configure the execute only transactional range of the memory comprises to configure the execute only transactional range of the memory in response to measurement of the execute only transactional code image.

Example 6 includes the subject matter of any of Examples 1-5, and wherein the code management module is further to execute the execute only transactional code image in response to configuration of the execute only transactional range of the memory.

Example 7 includes the subject matter of any of Examples 1-6, and wherein to execute the execute only transactional code image comprises to configure a port I/O device of the computing device with a secret stored as an immediate value of an instruction of the execute only transactional code image.

Example 8 includes the subject matter of any of Examples 1-7, and wherein to execute the execute only transactional code image further comprises to enforce access control to the port I/O device.

Example 9 includes the subject matter of any of Examples 1-8, and wherein to execute the execute only transactional code image comprises to: load, by the execute only transactional code image, a second execute only transactional code image into a second execute only transactional range of the memory; and configure, by the execute only transactional code image, the second execute only transactional range of the memory as execute only transactional memory in response to a loading of the second execute only transactional code image.

Example 10 includes the subject matter of any of Examples 1-9, and wherein: to execute the execute only transactional code image further comprises to measure, by the execute only transactional code image, the second execute only transactional code image in response to the loading of the second execute only transactional code image; wherein to configure the second execute only transactional range of the memory comprises to configure the second execute only transactional range of the memory in response to measurement of the second execute only transactional code image.

Example 11 includes the subject matter of any of Examples 1-10, and wherein: the processor further comprises an instruction translation lookaside buffer and a data translation lookaside buffer; the execute only module is further to execute a page miss handler of the processor in response to a page miss, wherein the page miss handler is to: (i) determine a virtual-to-physical address mapping in response to the page miss, wherein the virtual-to-physical address mapping associates a virtual memory address to a physical memory address, (ii) determine whether the physical memory address is within the execute only transactional range, (iii) populate the instruction translation lookaside buffer with the virtual-to-physical address mapping in response to a determination that the physical memory address is within the execute only transactional range, and (iv) prevent the data translation lookaside buffer from being populated with the virtual-to-physical address mapping in response to the determination that the page physical address is within the execute only transactional range.

Example 12 includes the subject matter of any of Examples 1-11, and wherein: the page miss handler is further to: (i) determine whether a page size associated with the execute only transactional range matches a page size associated with the physical memory address by a page table of the computing device and (ii) generate a page size mismatch fault in response to a determination that the page size associated with the execute only transactional range does not match the page size associated with the physical memory address by the page table; wherein to populate the instruction translation lookaside buffer of the processor with the virtual-to-physical address mapping further comprises to populate the instruction translation lookaside buffer of the processor with the virtual-to-physical address mapping in response to a determination that the page size associated with the execute only transactional range matches the page size associated with the physical memory address by the page table.

Example 13 includes the subject matter of any of Examples 1-12, and wherein to determine whether the last instruction pointer physical address is within the execute only transactional range comprises to determine a last translation value of the instruction translation lookaside buffer of the processor.

Example 14 includes the subject matter of any of Examples 1-13, and wherein to determine the last translation value of the instruction translation lookaside buffer of the processor comprises to read a last instruction translation lookaside buffer hit register of the processor.

Example 15 includes the subject matter of any of Examples 1-14, and further comprising an entry point module to execute a mapping change handler of the processor in response to a change in value of the last instruction translation lookaside buffer hit register, wherein the mapping change handler is to: determine a second physical memory address, wherein second physical memory address comprises a last translation value of the instruction translation lookaside buffer of the processor; determine whether the second physical memory address is within the execute only transaction range; determine whether an offset part of the second physical memory address matches a predefined entry point offset in response to a determination that the second physical memory address is within the execute only transaction range; and generate a fault in response to a determination that the offset part of the second physical memory address does not match the predefined entry point offset.

Example 16 includes the subject matter of any of Examples 1-15, and further comprising an entry point module to execute a miss handler of the processor in response to an instruction translation lookaside buffer miss, wherein the miss handler is to: determine whether a physical memory address associated with the instruction translation lookaside buffer miss is within an execute only transaction range; determine whether the physical memory address associated with the instruction translation lookaside buffer miss is at an authorized entry point in response to a determination that the physical memory address associated with the instruction translation lookaside buffer miss is within the execute only transaction range; and generate a fault in response to a determination that the physical memory address associated with the instruction translation lookaside buffer miss is not at an authorized entry point.

Example 17 includes the subject matter of any of Examples 1-16, and wherein: the miss handler is further to record an execute only transaction index of a virtual-to-physical address mapping associated with the instruction translation lookaside buffer miss in response to a determination that the physical memory address associated with the instruction translation lookaside buffer miss is at an authorized entry point; and the entry point module is further to execute a hit handler of the processor in response to an instruction translation lookaside buffer hit, wherein the hit handler is to: (i) determine whether a previous instruction executed by the processor was executed within an execute only transaction range, (ii) determine whether an index of a virtual-to-physical address mapping associated with the instruction translation lookaside buffer hit matches the recorded execute only transaction index in response to a determination that the previous instruction executed by the processor was executed within an execute only transaction range, and (iii) evict an entry of the instruction translation lookaside buffer at the recorded execute only transaction index in response to a determination that the index of the virtual-to-physical address mapping associated with the instruction translation lookaside buffer hit does not match the recorded execute only transaction index.

Example 18 includes the subject matter of any of Examples 1-17, and wherein: the miss handler is further to: (i) record an index of a virtual-to-physical address mapping associated with the instruction translation lookaside buffer miss as a last-used instruction translation buffer entry in response to a determination that the physical memory address associated with the instruction translation lookaside buffer miss is at an authorized entry point and (ii) set an execute only transaction bit of the virtual-to-physical address mapping associated with the instruction translation lookaside buffer miss in response to the determination that the physical memory address associated with the instruction translation lookaside buffer miss is at an authorized entry point; and the entry point module is further to execute a hit handler of the processor in response to an instruction translation lookaside buffer hit, wherein the hit handler is to: (i) determine whether an index of a virtual-to-physical address mapping associated with the instruction translation lookaside buffer hit matches an index of the last-used instruction translation buffer entry, (ii) determine whether an execute only transaction bit of the virtual-to-physical address mapping associated with the instruction translation lookaside buffer hit is set in response to a determination that the index of the virtual-to-physical address mapping associated with the instruction translation lookaside buffer hit does not match the index of the last-used instruction translation buffer entry, (iii) determine whether a physical memory address associated with the instruction translation lookaside buffer hit is at an authorized entry point in response to a determination that the execute only transaction bit of the virtual-to-physical address mapping associated with the instruction translation lookaside buffer hit is set, and (iv) generate a fault in response to a determination that the physical memory address associated with the instruction translation lookaside buffer hit is not at an authorized entry point.

Example 19 includes the subject matter of any of Examples 1-18, and wherein the transactional module is further to execute an interrupt handler of the processor in response to the change of control flow, wherein the interrupt handler is to: determine whether a last instruction pointer physical address is within the execute only transactional range; and secure the processor state of the processor in response to a determination that the last instruction pointer physical address is within the execute only transactional range.

Example 20 includes the subject matter of any of Examples 1-19, and wherein to secure the processor state of the processor comprises to clear one or more registers of the processor.

Example 21 includes the subject matter of any of Examples 1-20, and wherein to secure the processor state comprises to: determine whether the execute only transaction range was entered properly; encrypt the processor state of the processor to generate an encrypted processor state in response to a determination that the execute only transaction range was entered properly; calculate an integrity check value over the processor state in response to the determination that the execute only transaction range was entered properly; and store the encrypted processor state and the integrity check value.

Example 22 includes the subject matter of any of Examples 1-21, and wherein to secure the processor state comprises to clear a thread-local storage memory area of the computing device.

Example 23 includes the subject matter of any of Examples 1-22, and wherein to secure the processor state comprises to clear dirty entries in a local cache memory of the processor of the computing device.

Example 24 includes a method for secure code execution, the method comprising: configuring, by a computing device, an execute only transactional range of a memory of the computing device, wherein the execute only transactional range cannot be read or written as data; and determining, by the computing device in response to a change of control flow other than a branch, whether a last instruction pointer physical address of a processor of the computing device is within the execute only transactional range; and securing, by the processor, a processor state of the processor in response to determining that the last instruction pointer physical address is within the execute only transactional range.

Example 25 includes the subject matter of Example 24, and further comprising: executing, by the computing device, a reset vector; and loading, by the computing device, an execute only transactional code image into the execute only transactional range of the memory in response to executing the reset vector; wherein configuring the execute only transactional range comprises configuring the execute only transactional range in response to loading the execute only transactional code image.

Example 26 includes the subject matter of any of Examples 24 and 25, and wherein configuring the execute only transactional range of the memory comprises writing to a set-once range register of the processor.

Example 27 includes the subject matter of any of Examples 24-26, and wherein configuring the execute only transactional range of the memory further comprises determining the set-once range register based on a page size of the execute only transactional range of the memory.

Example 28 includes the subject matter of any of Examples 24-27, and further comprising: measuring, by the computing device, the execute only transactional code image in response to loading the execute only transactional code image; wherein configuring the execute only transactional range of the memory comprises configuring the execute only transactional range of the memory in response to measuring the execute only transactional code image.

Example 29 includes the subject matter of any of Examples 24-28, and further comprising executing, by the computing device, the execute only transactional code image in response to configuring the execute only transactional range of the memory.

Example 30 includes the subject matter of any of Examples 24-29, and wherein executing the execute only transactional code image comprises configuring a port I/O device of the computing device with a secret stored as an immediate value of an instruction of the execute only transactional code image.

Example 31 includes the subject matter of any of Examples 24-30, and wherein executing the execute only transactional code image further comprises enforcing access control to the port I/O device.

Example 32 includes the subject matter of any of Examples 24-31, and wherein executing the execute only transactional code image comprises: loading, by the execute only transactional code image, a second execute only transactional code image into a second execute only transactional range of the memory; and configuring, by the execute only transactional code image, the second execute only transactional range of the memory as execute only transactional memory in response to loading the second execute only transactional code image.

Example 33 includes the subject matter of any of Examples 24-32, and wherein executing the execute only transactional code image further comprises: measuring, by the execute only transactional code image, the second execute only transactional code image in response to loading the second execute only transactional code image; wherein configuring the second execute only transactional range of the memory comprises configuring the second execute only transactional range of the memory in response to measuring the second execute only transactional code image.

Example 34 includes the subject matter of any of Examples 24-33, and wherein configuring the execute only transactional range of the memory comprises: executing, by the processor of the computing device, a page miss handler of the processor in response to a page miss; determining, by the page miss handler, a virtual-to-physical address mapping in response to the page miss, wherein the virtual-to-physical address mapping associates a virtual memory address to a physical memory address; determining, by the page miss handler, whether the physical memory address is within the execute only transactional range; populating, by the page miss handler, an instruction translation lookaside buffer of the processor with the virtual-to-physical address mapping in response to determining that the physical memory address is within the execute only transactional range; and preventing, by the page miss handler, a data translation lookaside buffer of the processor from being populated with the virtual-to-physical address mapping in response to determining that the page physical address is within the execute only transactional range.

Example 35 includes the subject matter of any of Examples 24-34, and further comprising: determining, by the page miss handler, whether a page size associated with the execute only transactional range matches a page size associated with the physical memory address by a page table of the computing device; and generating, by the page miss handler, a page size mismatch fault in response to determining that the page size associated with the execute only transactional range does not match the page size associated with the physical memory address by the page table; wherein populating the instruction translation lookaside buffer of the processor with the virtual-to-physical address mapping further comprises populating the instruction translation lookaside buffer of the processor with the virtual-to-physical address mapping in response to determining that the page size associated with the execute only transactional range matches the page size associated with the physical memory address by the page table.

Example 36 includes the subject matter of any of Examples 24-35, and wherein determining whether the last instruction pointer physical address is within the execute only transactional range comprises determining a last translation value of the instruction translation lookaside buffer of the processor.

Example 37 includes the subject matter of any of Examples 24-36, and wherein determining the last translation value of the instruction translation lookaside buffer of the processor comprises reading a last instruction translation lookaside buffer hit register of the processor.

Example 38 includes the subject matter of any of Examples 24-37, and further comprising: executing, by the processor, a mapping change handler of the processor in response to a change in value of the last instruction translation lookaside buffer hit register; determining, by the mapping change handler, a second physical memory address, wherein second physical memory address comprises a last translation value of the instruction translation lookaside buffer of the processor; determining, by the mapping change handler, whether the second physical memory address is within the execute only transaction range; determining, by the mapping change handler, whether an offset part of the second physical memory address matches a predefined entry point offset in response to determining that the second physical memory address is within the execute only transaction range; and generating, by the mapping change handler, a fault in response to determining that the offset part of the second physical memory address does not match the predefined entry point offset.

Example 39 includes the subject matter of any of Examples 24-38, and further comprising: executing, by the processor, a miss handler of the processor in response to an instruction translation lookaside buffer miss; determining, by the miss handler, whether a physical memory address associated with the instruction translation lookaside buffer miss is within an execute only transaction range; determining, by the miss handler, whether the physical memory address associated with the instruction translation lookaside buffer miss is at an authorized entry point in response to determining that the physical memory address associated with the instruction translation lookaside buffer miss is within the execute only transaction range; and generating, by the miss handler, a fault in response to determining that the physical memory address associated with the instruction translation lookaside buffer miss is not at an authorized entry point.

Example 40 includes the subject matter of any of Examples 24-39, and further comprising: recording, by the miss handler, an execute only transaction index of a virtual-to-physical address mapping associated with the instruction translation lookaside buffer miss in response to determining that the physical memory address associated with the instruction translation lookaside buffer miss is at an authorized entry point; executing, by the processor, a hit handler of the processor in response to an instruction translation lookaside buffer hit; determining, by the hit handler, whether a previous instruction executed by the processor was executed within an execute only transaction range; determining, by the hit handler, whether an index of a virtual-to-physical address mapping associated with the instruction translation lookaside buffer hit matches the recorded execute only transaction index in response to determining that the previous instruction executed by the processor was executed within an execute only transaction range; and evicting, by the hit handler, an entry of the instruction translation lookaside buffer at the recorded execute only transaction index in response to determining that the index of the virtual-to-physical address mapping associated with the instruction translation lookaside buffer hit does not match the recorded execute only transaction index.

Example 41 includes the subject matter of any of Examples 24-40, and further comprising: recording, by the miss handler, an index of a virtual-to-physical address mapping associated with the instruction translation lookaside buffer miss as a last-used instruction translation buffer entry in response to determining that the physical memory address associated with the instruction translation lookaside buffer miss is at an authorized entry point; setting, by the miss handler, an execute only transaction bit of the virtual-to-physical address mapping associated with the instruction translation lookaside buffer miss in response to determining that the physical memory address associated with the instruction translation lookaside buffer miss is at an authorized entry point; executing, by the processor, a hit handler of the processor in response to an instruction translation lookaside buffer hit; determining, by the hit handler, whether an index of a virtual-to-physical address mapping associated with the instruction translation lookaside buffer hit matches an index of the last-used instruction translation buffer entry; determining, by the hit handler, whether an execute only transaction bit of the virtual-to-physical address mapping associated with the instruction translation lookaside buffer hit is set in response to determining that the index of the virtual-to-physical address mapping associated with the instruction translation lookaside buffer hit does not match the index of the last-used instruction translation buffer entry; determining, by the hit handler, whether a physical memory address associated with the instruction translation lookaside buffer hit is at an authorized entry point in response to determining that the execute only transaction bit of the virtual-to-physical address mapping associated with the instruction translation lookaside buffer hit is set; and generating, by the hit handler, a fault in response to determining that the physical memory address associated with the instruction translation lookaside buffer hit is not at an authorized entry point.

Example 42 includes the subject matter of any of Examples 24-41, and wherein: determining, in response to the change of control flow, whether the last instruction pointer physical address of the process is within the execute only transactional range comprises: executing, by the processor of the computing device, an interrupt handler of the processor in response to the change of control flow; and determining, by the interrupt handler, whether the last instruction pointer physical address is within the execute only transactional range; and wherein securing the processor state comprises securing, by the interrupt handler, the processor state of the processor in response to determining that the last instruction pointer physical address is within the execute only transactional range.

Example 43 includes the subject matter of any of Examples 24-42, and wherein securing the processor state of the processor comprises clearing one or more registers of the processor.

Example 44 includes the subject matter of any of Examples 24-43, and wherein securing the processor state comprises: determining whether the execute only transaction range was entered properly; encrypting the processor state of the processor to generate an encrypted processor state in response to determining that the execute only transaction range was entered properly; calculating an integrity check value over the processor state in response to determining that the execute only transaction range was entered properly; and storing the encrypted processor state and the integrity check value.

Example 45 includes the subject matter of any of Examples 24-44, and wherein securing the processor state comprises clearing a thread-local storage memory area of the computing device.

Example 46 includes the subject matter of any of Examples 24-45, and wherein securing the processor state comprises clearing dirty entries in a local cache memory of the processor of the computing device.

Example 47 includes a computing device comprising: a processor; and a memory having stored therein a plurality of instructions that when executed by the processor cause the computing device to perform the method of any of Examples 24-46.

Example 48 includes one or more machine readable storage media comprising a plurality of instructions stored thereon that in response to being executed result in a computing device performing the method of any of Examples 24-46.

Example 49 includes a computing device comprising means for performing the method of any of Examples 24-46.

Example 50 includes a computing device for secure code execution, the computing device comprising: means for configuring an execute only transactional range of a memory of the computing device, wherein the execute only transactional range cannot be read or written as data; and means for determining, in response to a change of control flow other than a branch, whether a last instruction pointer physical address of a processor of the computing device is within the execute only transactional range; and means for securing, by the processor, a processor state of the processor in response to determining that the last instruction pointer physical address is within the execute only transactional range.

Example 51 includes the subject matter of Example 50, and further comprising: means for executing a reset vector; and means for loading an execute only transactional code image into the execute only transactional range of the memory in response to executing the reset vector; wherein the means for configuring the execute only transactional range comprises means for configuring the execute only transactional range in response to loading the execute only transactional code image.

Example 52 includes the subject matter of any of Examples 50 and 51, and wherein the means for configuring the execute only transactional range of the memory comprises means for writing to a set-once range register of the processor.

Example 53 includes the subject matter of any of Examples 50-52, and wherein the means for configuring the execute only transactional range of the memory further comprises means for determining the set-once range register based on a page size of the execute only transactional range of the memory.

Example 54 includes the subject matter of any of Examples 50-53, and further comprising: means for measuring the execute only transactional code image in response to loading the execute only transactional code image; wherein the means for configuring the execute only transactional range of the memory comprises means for configuring the execute only transactional range of the memory in response to measuring the execute only transactional code image.

Example 55 includes the subject matter of any of Examples 50-54, and further comprising means for executing the execute only transactional code image in response to configuring the execute only transactional range of the memory.

Example 56 includes the subject matter of any of Examples 50-55, and wherein the means for executing the execute only transactional code image comprises means for configuring a port I/O device of the computing device with a secret stored as an immediate value of an instruction of the execute only transactional code image.

Example 57 includes the subject matter of any of Examples 50-56, and wherein the means for executing the execute only transactional code image further comprises means for enforcing access control to the port I/O device.

Example 58 includes the subject matter of any of Examples 50-57, and wherein the means for executing the execute only transactional code image comprises: means for loading, by the execute only transactional code image, a second execute only transactional code image into a second execute only transactional range of the memory; and means for configuring, by the execute only transactional code image, the second execute only transactional range of the memory as execute only transactional memory in response to loading the second execute only transactional code image.

Example 59 includes the subject matter of any of Examples 50-58, and wherein the means for executing the execute only transactional code image further comprises: means for measuring, by the execute only transactional code image, the second execute only transactional code image in response to loading the second execute only transactional code image; wherein the means for configuring the second execute only transactional range of the memory comprises means for configuring the second execute only transactional range of the memory in response to measuring the second execute only transactional code image.

Example 60 includes the subject matter of any of Examples 50-59, and wherein the means for configuring the execute only transactional range of the memory comprises: means for executing, by the processor, a page miss handler of the processor in response to a page miss; means for determining, by the page miss handler, a virtual-to-physical address mapping in response to the page miss, wherein the virtual-to-physical address mapping associates a virtual memory address to a physical memory address; means for determining, by the page miss handler, whether the physical memory address is within the execute only transactional range; means for populating, by the page miss handler, an instruction translation lookaside buffer of the processor with the virtual-to-physical address mapping in response to determining that the physical memory address is within the execute only transactional range; and means for preventing, by the page miss handler, a data translation lookaside buffer of the processor from being populated with the virtual-to-physical address mapping in response to determining that the page physical address is within the execute only transactional range.

Example 61 includes the subject matter of any of Examples 50-60, and further comprising: means for determining, by the page miss handler, whether a page size associated with the execute only transactional range matches a page size associated with the physical memory address by a page table of the computing device; and means for generating, by the page miss handler, a page size mismatch fault in response to determining that the page size associated with the execute only transactional range does not match the page size associated with the physical memory address by the page table; wherein the means for populating the instruction translation lookaside buffer of the processor with the virtual-to-physical address mapping further comprises populating the instruction translation lookaside buffer of the processor with the virtual-to-physical address mapping in response to determining that the page size associated with the execute only transactional range matches the page size associated with the physical memory address by the page table.

Example 62 includes the subject matter of any of Examples 50-61, and wherein the means for determining whether the last instruction pointer physical address is within the execute only transactional range comprises means for determining a last translation value of the instruction translation lookaside buffer of the processor.

Example 63 includes the subject matter of any of Examples 50-62, and wherein the means for determining the last translation value of the instruction translation lookaside buffer of the processor comprises means for reading a last instruction translation lookaside buffer hit register of the processor.

Example 64 includes the subject matter of any of Examples 50-63, and further comprising: means for executing, by the processor, a mapping change handler of the processor in response to a change in value of the last instruction translation lookaside buffer hit register; means for determining, by the mapping change handler, a second physical memory address, wherein second physical memory address comprises a last translation value of the instruction translation lookaside buffer of the processor; means for determining, by the mapping change handler, whether the second physical memory address is within the execute only transaction range; means for determining, by the mapping change handler, whether an offset part of the second physical memory address matches a predefined entry point offset in response to determining that the second physical memory address is within the execute only transaction range; and means for generating, by the mapping change handler, a fault in response to determining that the offset part of the second physical memory address does not match the predefined entry point offset.

Example 65 includes the subject matter of any of Examples 50-64, and further comprising: means for executing, by the processor, a miss handler of the processor in response to an instruction translation lookaside buffer miss; means for determining, by the miss handler, whether a physical memory address associated with the instruction translation lookaside buffer miss is within an execute only transaction range; means for determining, by the miss handler, whether the physical memory address associated with the instruction translation lookaside buffer miss is at an authorized entry point in response to determining that the physical memory address associated with the instruction translation lookaside buffer miss is within the execute only transaction range; and means for generating, by the miss handler, a fault in response to determining that the physical memory address associated with the instruction translation lookaside buffer miss is not at an authorized entry point.

Example 66 includes the subject matter of any of Examples 50-65, and further comprising: means for recording, by the miss handler, an execute only transaction index of a virtual-to-physical address mapping associated with the instruction translation lookaside buffer miss in response to determining that the physical memory address associated with the instruction translation lookaside buffer miss is at an authorized entry point; means for executing, by the processor, a hit handler of the processor in response to an instruction translation lookaside buffer hit; means for determining, by the hit handler, whether a previous instruction executed by the processor was executed within an execute only transaction range; means for determining, by the hit handler, whether an index of a virtual-to-physical address mapping associated with the instruction translation lookaside buffer hit matches the recorded execute only transaction index in response to determining that the previous instruction executed by the processor was executed within an execute only transaction range; and means for evicting, by the hit handler, an entry of the instruction translation lookaside buffer at the recorded execute only transaction index in response to determining that the index of the virtual-to-physical address mapping associated with the instruction translation lookaside buffer hit does not match the recorded execute only transaction index.

Example 67 includes the subject matter of any of Examples 50-66, and further comprising: means for recording, by the miss handler, an index of a virtual-to-physical address mapping associated with the instruction translation lookaside buffer miss as a last-used instruction translation buffer entry in response to determining that the physical memory address associated with the instruction translation lookaside buffer miss is at an authorized entry point; means for setting, by the miss handler, an execute only transaction bit of the virtual-to-physical address mapping associated with the instruction translation lookaside buffer miss in response to determining that the physical memory address associated with the instruction translation lookaside buffer miss is at an authorized entry point; means for executing, by the processor, a hit handler of the processor in response to an instruction translation lookaside buffer hit; means for determining, by the hit handler, whether an index of a virtual-to-physical address mapping associated with the instruction translation lookaside buffer hit matches an index of the last-used instruction translation buffer entry; means for determining, by the hit handler, whether an execute only transaction bit of the virtual-to-physical address mapping associated with the instruction translation lookaside buffer hit is set in response to determining that the index of the virtual-to-physical address mapping associated with the instruction translation lookaside buffer hit does not match the index of the last-used instruction translation buffer entry; means for determining, by the hit handler, whether a physical memory address associated with the instruction translation lookaside buffer hit is at an authorized entry point in response to determining that the execute only transaction bit of the virtual-to-physical address mapping associated with the instruction translation lookaside buffer hit is set; and means for generating, by the hit handler, a fault in response to determining that the physical memory address associated with the instruction translation lookaside buffer hit is not at an authorized entry point.

Example 68 includes the subject matter of any of Examples 50-67, and wherein: the means for determining, in response to the change of control flow, whether the last instruction pointer physical address of the process is within the execute only transactional range comprises: means for executing, by the processor of the computing device, an interrupt handler of the processor in response to the change of control flow; and means for determining, by the interrupt handler, whether the last instruction pointer physical address is within the execute only transactional range; and wherein the means for securing the processor state comprises means for securing, by the interrupt handler, the processor state of the processor in response to determining that the last instruction pointer physical address is within the execute only transactional range.

Example 69 includes the subject matter of any of Examples 50-68, and wherein the means for securing the processor state of the processor comprises means for clearing one or more registers of the processor.

Example 70 includes the subject matter of any of Examples 50-69, and wherein the means for securing the processor state comprises: means for determining whether the execute only transaction range was entered properly; means for encrypting the processor state of the processor to generate an encrypted processor state in response to determining that the execute only transaction range was entered properly; means for calculating an integrity check value over the processor state in response to determining that the execute only transaction range was entered properly; and means for storing the encrypted processor state and the integrity check value.

Example 71 includes the subject matter of any of Examples 50-70, and wherein the means for securing the processor state comprises means for clearing a thread-local storage memory area of the computing device.

Example 72 includes the subject matter of any of Examples 50-71, and wherein the means for securing the processor state comprises means for clearing dirty entries in a local cache memory of the processor of the computing device.

The invention claimed is:

1. A computing device for secure code execution, the computing device comprising:
   code management circuitry to (i) execute a reset vector and (ii) load an execute only transactional code image into an execute only transactional range of a memory of the computing device in response to execution of the reset vector;
   execute only circuitry to configure the execute only transactional range of the memory of the computing device in response to a loading of the execute only transactional code image, wherein the execute only transactional range cannot be read or written as data; and
   transactional circuitry to (i) determine, in response to a change of control flow other than a branch, whether a last instruction pointer physical address of a processor of the computing device is within the execute only transactional range, and (ii) secure a processor state of the processor in response to a determination that the last instruction pointer physical address is within the execute only transactional range.

2. The computing device of claim 1, wherein:
   the code management circuitry is further to measure the execute only transactional code image in response to the loading of the execute only transactional code image;
   wherein to configure the execute only transactional range of the memory comprises to configure the execute only transactional range of the memory in response to measurement of the execute only transactional code image.

3. The computing device of claim 1, wherein the code management circuitry is further to execute the execute only transactional code image in response to configuration of the execute only transactional range of the memory.

4. The computing device of claim 3, wherein to execute the execute only transactional code image comprises to configure a port I/O device of the computing device with a secret stored as an immediate value of an instruction of the execute only transactional code image.

5. The computing device of claim 1, wherein:
the processor further comprises an instruction translation lookaside buffer and a data translation lookaside buffer;
the execute only circuitry is further to execute a page miss handler of the processor in response to a page miss, wherein the page miss handler is to: (i) determine a virtual-to-physical address mapping in response to the page miss, wherein the virtual-to-physical address mapping associates a virtual memory address to a physical memory address, (ii) determine whether the physical memory address is within the execute only transactional range, (iii) populate the instruction translation lookaside buffer with the virtual-to-physical address mapping in response to a determination that the physical memory address is within the execute only transactional range, and (iv) prevent the data translation lookaside buffer from being populated with the virtual-to-physical address mapping in response to the determination that the page physical address is within the execute only transactional range.

6. The computing device of claim 5, wherein:
the page miss handler is further to: (i) determine whether a page size associated with the execute only transactional range matches a page size associated with the physical memory address by a page table of the computing device and (ii) generate a page size mismatch fault in response to a determination that the page size associated with the execute only transactional range does not match the page size associated with the physical memory address by the page table;
wherein to populate the instruction translation lookaside buffer of the processor with the virtual-to-physical address mapping further comprises to populate the instruction translation lookaside buffer of the processor with the virtual-to-physical address mapping in response to a determination that the page size associated with the execute only transactional range matches the page size associated with the physical memory address by the page table.

7. The computing device of claim 1, wherein the transactional circuitry is further to execute an interrupt handler of the processor in response to the change of control flow, wherein the interrupt handler is to:
determine whether a last instruction pointer physical address is within the execute only transactional range; and
secure the processor state of the processor in response to a determination that the last instruction pointer physical address is within the execute only transactional range.

8. The computing device of claim 1, wherein to secure the processor state of the processor comprises to clear one or more registers of the processor.

9. The computing device of claim 1, wherein to secure the processor state comprises to:
determine whether the execute only transaction range was entered properly;
encrypt the processor state of the processor to generate an encrypted processor state in response to a determination that the execute only transaction range was entered properly;
calculate an integrity check value over the processor state in response to the determination that the execute only transaction range was entered properly; and
store the encrypted processor state and the integrity check value.

10. The computing device of claim 1, wherein to secure the processor state comprises to clear a thread-local storage memory area of the computing device.

11. A method for secure code execution, the method comprising:
executing, by a computing device, a reset vector;
loading, by the computing device, an execute only transactional code image into an execute only transactional range of a memory of the computing device in response to executing the reset vector;
configuring, by the computing device, the execute only transactional range of the memory of the computing device in response to loading the execute only transactional code image, wherein the execute only transactional range cannot be read or written as data;
determining, by the computing device in response to a change of control flow other than a branch, whether a last instruction pointer physical address of a processor of the computing device is within the execute only transactional range; and
securing, by the processor, a processor state of the processor in response to determining that the last instruction pointer physical address is within the execute only transactional range.

12. The method of claim 11, wherein configuring the execute only transactional range of the memory comprises:
executing, by the processor of the computing device, a page miss handler of the processor in response to a page miss;
determining, by the page miss handler, a virtual-to-physical address mapping in response to the page miss, wherein the virtual-to-physical address mapping associates a virtual memory address to a physical memory address;
determining, by the page miss handler, whether the physical memory address is within the execute only transactional range;
populating, by the page miss handler, an instruction translation lookaside buffer of the processor with the virtual-to-physical address mapping in response to determining that the physical memory address is within the execute only transactional range; and
preventing, by the page miss handler, a data translation lookaside buffer of the processor from being populated with the virtual-to-physical address mapping in response to determining that the page physical address is within the execute only transactional range.

13. The method of claim 12, further comprising:
determining, by the page miss handler, whether a page size associated with the execute only transactional range matches a page size associated with the physical memory address by a page table of the computing device; and
generating, by the page miss handler, a page size mismatch fault in response to determining that the page size associated with the execute only transactional range does not match the page size associated with the physical memory address by the page table;

wherein populating the instruction translation lookaside buffer of the processor with the virtual-to-physical address mapping further comprises populating the instruction translation lookaside buffer of the processor with the virtual-to-physical address mapping in response to determining that the page size associated with the execute only transactional range matches the page size associated with the physical memory address by the page table.

14. The method of claim 11, wherein:
determining, in response to the change of control flow, whether the last instruction pointer physical address of the process is within the execute only transactional range comprises:
   executing, by the processor of the computing device, an interrupt handler of the processor in response to the change of control flow; and
   determining, by the interrupt handler, whether the last instruction pointer physical address is within the execute only transactional range; and
wherein securing the processor state comprises securing, by the interrupt handler, the processor state of the processor in response to determining that the last instruction pointer physical address is within the execute only transactional range.

15. The method of claim 11, wherein securing the processor state of the processor comprises clearing one or more registers of the processor.

16. The method of claim 11, wherein securing the processor state comprises:
   determining whether the execute only transaction range was entered properly;
   encrypting the processor state of the processor to generate an encrypted processor state in response to determining that the execute only transaction range was entered properly;
   calculating an integrity check value over the processor state in response to determining that the execute only transaction range was entered properly; and
   storing the encrypted processor state and the integrity check value.

17. One or more non-transitory, machine readable storage media comprising a plurality of instructions that in response to being executed cause a computing device to:
   execute a reset vector;
   load an execute only transactional code image into an execute only transactional range of a memory of the computing device in response to executing the reset vector;
   configure the execute only transactional range of the memory of the computing device in response to loading the execute only transactional code image, wherein the execute only transactional range cannot be read or written as data;
   determine, in response to a change of control flow other than a branch, whether a last instruction pointer physical address of a processor of the computing device is within the execute only transactional range; and
   secure, by the processor, a processor state of the processor in response to determining that the last instruction pointer physical address is within the execute only transactional range.

18. The one or more non-transitory, machine readable storage media of claim 17, wherein to configure the execute only transactional range of the memory comprises to:
   execute, by the processor, a page miss handler of the processor in response to a page miss;
   determine, by the page miss handler, a virtual-to-physical address mapping in response to the page miss, wherein the virtual-to-physical address mapping associates a virtual memory address to a physical memory address;
   determine, by the page miss handler, whether the physical memory address is within the execute only transactional range;
   populate, by the page miss handler, an instruction translation lookaside buffer of the processor with the virtual-to-physical address mapping in response to determining that the physical memory address is within the execute only transactional range; and
   prevent, by the page miss handler, a data translation lookaside buffer of the processor from being populated with the virtual-to-physical address mapping in response to determining that the page physical address is within the execute only transactional range.

19. The one or more non-transitory, machine readable storage media of claim 18, further comprising a plurality of instructions that in response to being executed cause the computing device to:
   determine, by the page miss handler, whether a page size associated with the execute only transactional range matches a page size associated with the physical memory address by a page table of the computing device; and
   generate, by the page miss handler, a page size mismatch fault in response to determining that the page size associated with the execute only transactional range does not match the page size associated with the physical memory address by the page table;
wherein to populate the instruction translation lookaside buffer of the processor with the virtual-to-physical address mapping further comprises to populate the instruction translation lookaside buffer of the processor with the virtual-to-physical address mapping in response to determining that the page size associated with the execute only transactional range matches the page size associated with the physical memory address by the page table.

20. The one or more non-transitory, machine readable storage media of claim 17, wherein:
to determine, in response to the change of control flow, whether the last instruction pointer physical address of the process is within the execute only transactional range comprises to:
   execute, by the processor of the computing device, an interrupt handler of the processor in response to the change of control flow; and
   determine, by the interrupt handler, whether the last instruction pointer physical address is within the execute only transactional range; and
wherein to secure the processor state comprises to secure, by the interrupt handler, the processor state of the processor in response to determining that the last instruction pointer physical address is within the execute only transactional range.

21. The one or more non-transitory, machine readable storage media of claim 17, wherein to secure the processor state of the processor comprises to clear one or more registers of the processor.

22. The one or more non-transitory, machine readable storage media of claim 17, wherein to secure the processor state comprises to:
   determine whether the execute only transaction range was entered properly;

encrypt the processor state of the processor to generate an encrypted processor state in response to determining that the execute only transaction range was entered properly;

calculate an integrity check value over the processor state in response to determining that the execute only transaction range was entered properly; and store the encrypted processor state and the integrity check value.

\* \* \* \* \*